(12) United States Patent
Donescu et al.

(10) Patent No.: US 7,467,184 B2
(45) Date of Patent: Dec. 16, 2008

(54) METHOD AND DEVICE FOR DATA PROCESSING IN A COMMUNICATION NETWORK

(75) Inventors: Ioana Donescu, Rennes (FR); Fabrice Le Leannec, Cesson Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 790 days.

(21) Appl. No.: 10/612,947

(22) Filed: Jul. 7, 2003

(65) Prior Publication Data
US 2004/0039810 A1    Feb. 26, 2004

(30) Foreign Application Priority Data
Jul. 5, 2002    (FR)    .................................. 02 08465

(51) Int. Cl.
G06F 15/16    (2006.01)
(52) U.S. Cl. ........................ 709/203; 709/205; 709/212; 709/213; 709/217; 709/245
(58) Field of Classification Search ................. 709/203, 709/205, 212, 213, 218, 245, 217, 231, 232, 709/201
See application file for complete search history.

(56) References Cited

U.S. PATENT DOCUMENTS

| | | | | |
|---|---|---|---|---|
| 5,835,911 A * | 11/1998 | Nakagawa et al. | ........... | 707/203 |
| 5,946,680 A | 8/1999 | Shorter et al. | ................... | 707/3 |
| 5,953,506 A * | 9/1999 | Kalra et al. | ................. | 709/231 |
| 6,009,457 A * | 12/1999 | Moller | ....................... | 709/203 |
| 6,026,474 A * | 2/2000 | Carter et al. | ................. | 711/202 |
| 6,041,143 A | 3/2000 | Chui et al. | ................... | 382/232 |
| 6,145,016 A * | 11/2000 | Lai et al. | ........................ | 710/4 |
| 6,279,041 B1 * | 8/2001 | Baber et al. | ................. | 709/232 |
| 6,311,209 B1 * | 10/2001 | Olson et al. | ................. | 709/204 |
| 6,374,289 B2 | 4/2002 | Delaney et al. | ............. | 709/203 |
| 6,405,256 B1 * | 6/2002 | Lin et al. | ..................... | 709/231 |
| 6,571,279 B1 * | 5/2003 | Herz et al. | ................... | 709/217 |
| 6,658,464 B2 * | 12/2003 | Reisman | ..................... | 709/219 |
| 6,801,938 B1 * | 10/2004 | Bookman et al. | ........... | 709/224 |
| 6,941,324 B2 * | 9/2005 | Plastina et al. | ........... | 707/104.1 |

(Continued)

FOREIGN PATENT DOCUMENTS

WO    WO 99/38092    7/1999

(Continued)

OTHER PUBLICATIONS

Deshpande, S., et al., "HTTP Streaming of JPEG 2000 Images", Proc. ACM Multimedia, Oct. 2001.

*Primary Examiner*—Michael Won
(74) *Attorney, Agent, or Firm*—Fitzpatrick, Cella, Harper & Scinto

(57) ABSTRACT

The invention relates to a method of processing a digital signal identified by a unique identifier in a distributed communication network composed of several communication apparatuses, comprising the steps of:
- storing at least a part of me data constituting the identified digital signal in a local storage located in one of the apparatus; and
- managing two descriptors related to the identifier within the local storage, including a first descriptor representative of the identified digital signal and a second descriptor which is dependent on the first descriptor and representative of the part of the data stored in the local storage.

40 Claims, 19 Drawing Sheets

U.S. PATENT DOCUMENTS

| | | | |
|---|---|---|---|
| 6,996,618 B2 * | 2/2006 | Apostolopoulos et al. | 709/227 |
| 7,062,541 B1 * | 6/2006 | Cannon et al. | 709/219 |
| 7,155,531 B1 * | 12/2006 | Lango et al. | 709/231 |
| 2002/0099853 A1 | 7/2002 | Tsujii et al. | |
| 2003/0115274 A1 * | 6/2003 | Weber | 709/206 |

FOREIGN PATENT DOCUMENTS

| | | |
|---|---|---|
| WO | WO 00/65838 | 11/2000 |
| WO | WO 02/15035 | 2/2002 |

* cited by examiner

METHOD AND DEVICE FOR DATA PROCESSING IN A COMMUNICATION NETWORK

The invention relates to a method and device fur processing digital data constituting a signal in a communication network comprising a plurality of communication apparatuses.

In a client-server type architecture, it is known to transmit multimedia data in multi-resolution format, such as images or parts of images from the server to a client machine, further to a request from the client machine.

The requested image part may for example correspond to a spatial part of the image or else to one or more resolution levels of the image or of a spatial part of it.

In such an architecture, the client machines which desire to receive a part of the image stored on the server must refer to the latter.

A client-server architecture is known from the document entitled "Scalable streaming of jpeg2000 images using hypertext transfer protocol" by S. Deshpande and W. Zeng in Proc. ACM Multimedia, October 2001.

According to this document image signals compressed in JPEG2000 format are stored at the server.

On the initialization of a communication session with the client machine, the server transmits to it a sort of table of contents of an image signal which will later allow the user to formulate a request for obtaining a part of the signal.

The request specifying the data desired and their address in the signal is formulated using HTTP (Hypertext Transfer Protocol) which dispenses the server from needing to know the JPEG2000 format.

In a communication network of distributed type provision is however made for sharing digital data, such as audio files, for example in MP3 format, between a plurality of communication apparatuses connected to the network.

Such communication systems, also called "peer-to-peer" systems, are advantageous with respect to client-server architectures in terms of the space required to store data and in terms of bandwidth relatively at each communication apparatus or terminal connected to the network.

More particularly, in a distributed network, on the one hand, the resources necessary for the storage of data in comparison with those of a central server in a client-server architecture, and, on the other hand the communication load between two communications apparatuses connected together via the distributed network in comparison with the communication load between the central server and a client machine, are greatly reduced for an equivalent quality of services.

Such a communication system within a distributed network is known in particular from the international application WO 02/15035 in the name of Napster Inc. and entitled "System and method for searching peer-to-peer computer networks".

It should be noted that, in a distributed network such as the internet, the communication apparatuses connected, which are, for example, computers, may be considered either as being clients and thus receiving data, or as servers and thus supplying data to other apparatuses of the network.

However, in such a network the apparatuses are not connected in a permanent manner to the network, which means that the requests coming from apparatuses for obtaining data from other apparatuses are processed in asynchronous mode and that all the data are not accessible at all times.

Thus, as a function of the instant at which a client connects itself to the network via a communication apparatus, the client may call upon the source of the data if the source apparatus holding these data is still connected to the network, or else call upon other apparatuses which may have previously stored all or a part of these data.

However, when the client wishes to receive a part of those data it does not know precisely where the data it is missing are present locally in the network.

Thus, it is induced to request the missing data by sending requests to one or more communication apparatuses without knowing if they actually hold these data.

The result of such a procedure is often uncertain.

Furthermore, the client sometimes receives useless information.

Moreover, we have noted that it may sometimes take a relatively long time before the client finally obtains the missing data.

The present invention therefore provides a method of processing a digital signal identified by a unique identifier in a distributed communication network composed of several communication apparatuses, comprising the steps of:

storing at least a part of the data constituting the identified digital signal in a local storage located in one of the apparatus; and managing two descriptors related to the identifier within the local storage, including a first descriptor representative of the identified digital signal and a second descriptor which is dependent on the first descriptor and representative of the part of the data stored in the local storage.

In a complementary manner, the invention relates to a device for processing a digital signal, identified by a unique identifier in a distributed communication network composed of several communication apparatuses, comprising:

means of storing at least a part of the data constituting the identified digital signal in a local storage located in one of the apparatus; and means of managing two descriptors related to the identifier within the local storage, including a first descriptor representative of the identified digital signal and a second descriptor which is dependent on the first descriptor and representative of the part of the data stored in the local storage.

Through the use of the first descriptor, it is thus possible to retrieve the second descriptor and then to get information on the availability of data stored locally.

The management of both descriptors in a local storag makes easier the retrieval of information in the concerned apparatus and the network as well.

Having this local information, it is thus possible for apparatuses to know what other apparatuses contain as local data.

It Is thus possible to rapidly have access to the information about the local presence or absence of data at a communication apparatus which is, for example, a potential server.

According to one feature, the method further comprises a step of updating the second descriptor as a function of the data representative of the identified digital signal received and stored in the local storage.

Thus, on receiving a part of the signal, each apparatus updates a descriptor of local data in order to be able to inform, later on, other apparatuses so requesting, of the local presence of data making up the part of the signal received.

According to another feature, the method further comprises a step of sending from a server apparatus, a notification of availability of the identified signal to at least one client apparatus in the communication network, including the first descriptor of the identified signal.

The transmission of this local information thus makes it possible for the at least one client apparatus rapidly to have knowledge of the server apparatus or apparatuses where the relevant data is locally present.

According to one feature, the method further comprises steps, performed by a server apparatus in the communication network, of:
- receiving from a client apparatus a request containing the signal identifier; and
- sending to the client apparatus the second descriptor related to the identifier and representative of the data relative to the identified signal stored in the local storage. If the identifier is known by the server apparatus.

The signal identifier makes it possible for the server apparatus to retrieve the relevant information related to the digital signal and then to transmit to the client apparatus a second descriptor informing the latter of the data locally stored.

The second descriptor provides a description of all the data present in the signal at the server apparatus.

Thus, for example, for an image signal, the second descriptor will contain the following information: header data of the signal, size of the data packets and positions of these packets in the bitstream of the signal.

On having a part of the signal and the second descriptor, the client apparatus or apparatuses may decide they wish to receive data of the signal that are supplementary with respect to those contained in the part already received, such as an additional resolution level.

According to one feature, the method further comprises steps, performed by a server apparatus in the communication network, of:
- receiving from a client apparatus one request of data relative to the identified signal;
- retrieving in the local storage at least part of requested data; and
- sending to the client apparatus said at least part of requested data.

According to one feature, the method further comprises steps, performed by a server apparatus in the communication network, of:
- receiving from a communication apparatus one request of data relative to the identified signal and one second descriptor representative of the data which is locally present on the client apparatus at the origin of the request;
- retrieving in the local storage at least part of requested data;
- sending to the client apparatus at the origin of the request said at least part of requested data; and
- updating the second descriptor as a function of said at least part of requested data which has been sent.

According to one feature, the method further comprises a step, performed by a server apparatus in the communication network of sending to another server apparatus the updated second descriptor and the request of data which has been modified to take into account said at least part of requested data which has been piously sent by said server apparatus.

According to one feature, the method further comprises steps, performed by a client apparatus in the communication network prior to said storing step, of:
- receiving the first descriptor representative of the identified digital signal; and
- storing the first descriptor in the local storage.

According to one feature, the method further comprises a step, performed by a client apparatus in the communication network, of receiving a notification of availability of the data relative to the unique identifier.

According to one feature, the method further comprises a step, performed by a client apparatus in the communication network, of sending to at least one server apparatus at least one request containing the signal identifier.

According to one feature, the method further comprises steps, performed by a client apparatus in the communication network for retrieving at least a part of the digital signal, of:
- receiving at least one second descriptor representative of the data locally present on at last one server; and
- issuing at least one request of data, directed to said at least one server, as a function of the first descriptor and the at least one second descriptor.

According to one feature, the method further comprises a step, performed by a client apparatus in the communication network, of receiving from at least one server at least part of the data constituting the identified signal and which has been specified in the previously sent request of data.

According to one feature, the method further comprises a step, performed by a client apparatus in the communication network, of sending to at least one server at least one request of data as a function of the received first descriptor, and the second descriptor representative of the data locally present on the client apparatus.

According to one feature, the digital signal is in multiresolution format.

According to one feature, the first descriptor is representative of all available resolutions and their representation units (precincts) in a compressed format.

According to one feature, the second descriptor is representative of the units of the compressed format (precincts) as referenced in the first descriptor.

According to one feature, the second descriptor has a hierarchical structure.

Thus, the hierarchical nature of the local descriptor makes it possible to rapidly identify the macro-entities of data present on an apparatus, without needing to go through the whole descriptor until the level of the most elementary data is reached.

In this manner, it is possible very rapidly to detect whether an apparatus has received, for example, the whole of one resolution level of the signal, by consulting the local data hierarchical descriptor.

The invention also concerns a communication apparatus comprising a device as briefly disclosed above.

According to another aspect, the invention also relates to:
- an information storage means which can be read by a computer or a microprocessor containing code instructions for a computer program for executing the steps of the method according to the invention as for the one briefly set out above, and
- a partially or totally removable information storage means which can be read by a computer or microprocessor containing code instructions for a computer program for executing the steps of the method according to the invention as for the one briefly disclosed above.

According to yet another aspect, the invention relates to a computer program which can be loaded into a programmable apparatus, containing sequences of instructions or portions of software code for implementing steps of the method according to the invention as briefly set out above, when said computer program is loaded and executed on the programmable apparatus.

As the features and advantages relating to the device according to the invention, to the communication apparatus comprising such a device, to the information storage means and to the computer program are the same as those set out above concerning the method according to the invention, they will not be repeated here.

Other features and advantages of the present invention will emerge more clearly from a reading of the following description, made with reference to the accompanying drawings, in which:

FIG. 5b illustrates an embodiment different to that of the algorithm of FIG. 5a;

FIGS. 12b to 12d illustrate different embodiments of the algorithm of FIG. 12a;

Figure 1:
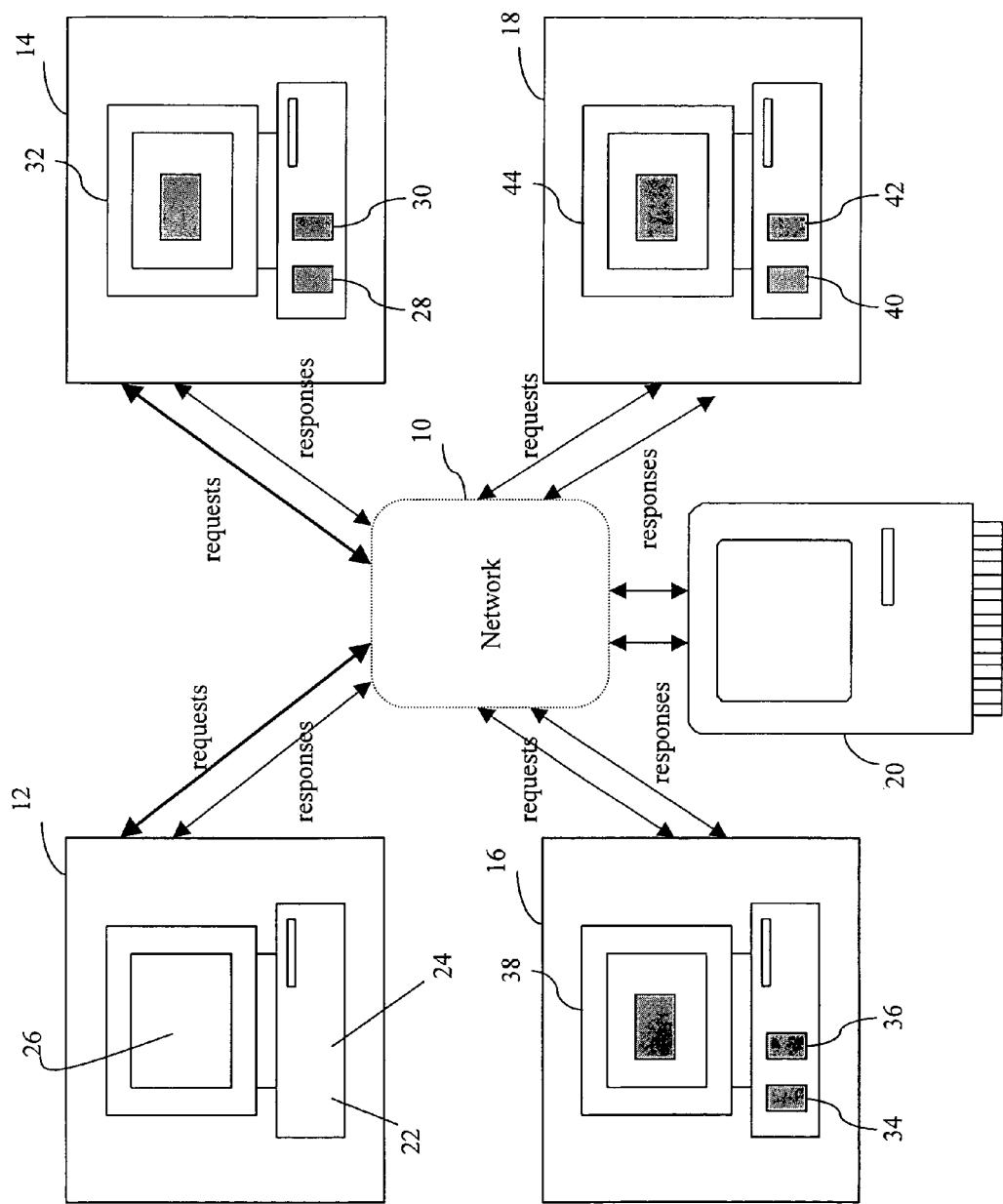
FIG. 1 is a diagram of a communication network of distributed type.

As represented in FIG. 1 and designated by the general reference numeral 10, a communication network of distributed type such as the internet links a plurality of communication apparatuses 12, 14, 16, and 18 together as well as possibly a communication apparatus 20 which fulfills the role of a central server.

The latter is always connected to the network 10 and stores a set of data based on the exchanges which have taken place between the communication apparatuses in the form of requests and responses.

It should be noted that the term peer-to-peer exchanges is used in this context.

The set of data stored on the central server 20 contains, for example, information on the presence of each of the communication apparatuses identified as forming part of the network, information on the contents which are stored locally in each communication apparatus, etc.

Is it also possible that the central server has certain date which may be found elsewhere in one or more communication apparatuses connected to the network.

The communication apparatuses connected to the network have known communication means.

Each of the communication apparatuses may for example take the form of the apparatus represented in FIG. 14 and of which the description will be given later.

It will be noted that each communication apparatus may either comprise a device according to the invention or correspond to a device according to the invention.

The communication apparatus 12 comprises a volatile memory (cache memory) 22, a file server 24 and a user interface 26 enabling the user to formulate requests which will be transmitted via the network 10 to other communication apparatuses.

According to the invention, the communication apparatuses 12 to 18 communicate directly with each other via the network 10.

Nevertheless, according to a variant form of the invention, the central server 20 may also participate in the communication between the different communication apparatuses 12 to 18.

The communication apparatuses 14, 16 and 18 also comprise a volatile memory, a file server and a user interface which are respectively referenced 28, 30 and 32 for the apparatus 14, 34, 36 and 38 for the apparatus 16 and 40, 42 and 44 for the apparatus 18.

It will be noted that the invention applies to the transmission of multimedia digital data via the distributed communication network 10 represented in FIG. 1.

In the example embodiment the multimedia data concerned make up an image signal having several levels of resolution, that is to say that several spatial resolutions of the same image are contained in the same file.

The data may be compressed or not without this affecting the principle of the invention.

More particularly, the compression format used in the description which follows is that used in the JPEG2000 standard but other multi-resolution formats may of course be envisaged.

Generally the invention also applies to the transmission of multimedia data within the network of FIG. 1, in which the data may make up a video signal or another possibility is an audio signal.

Figure 2:
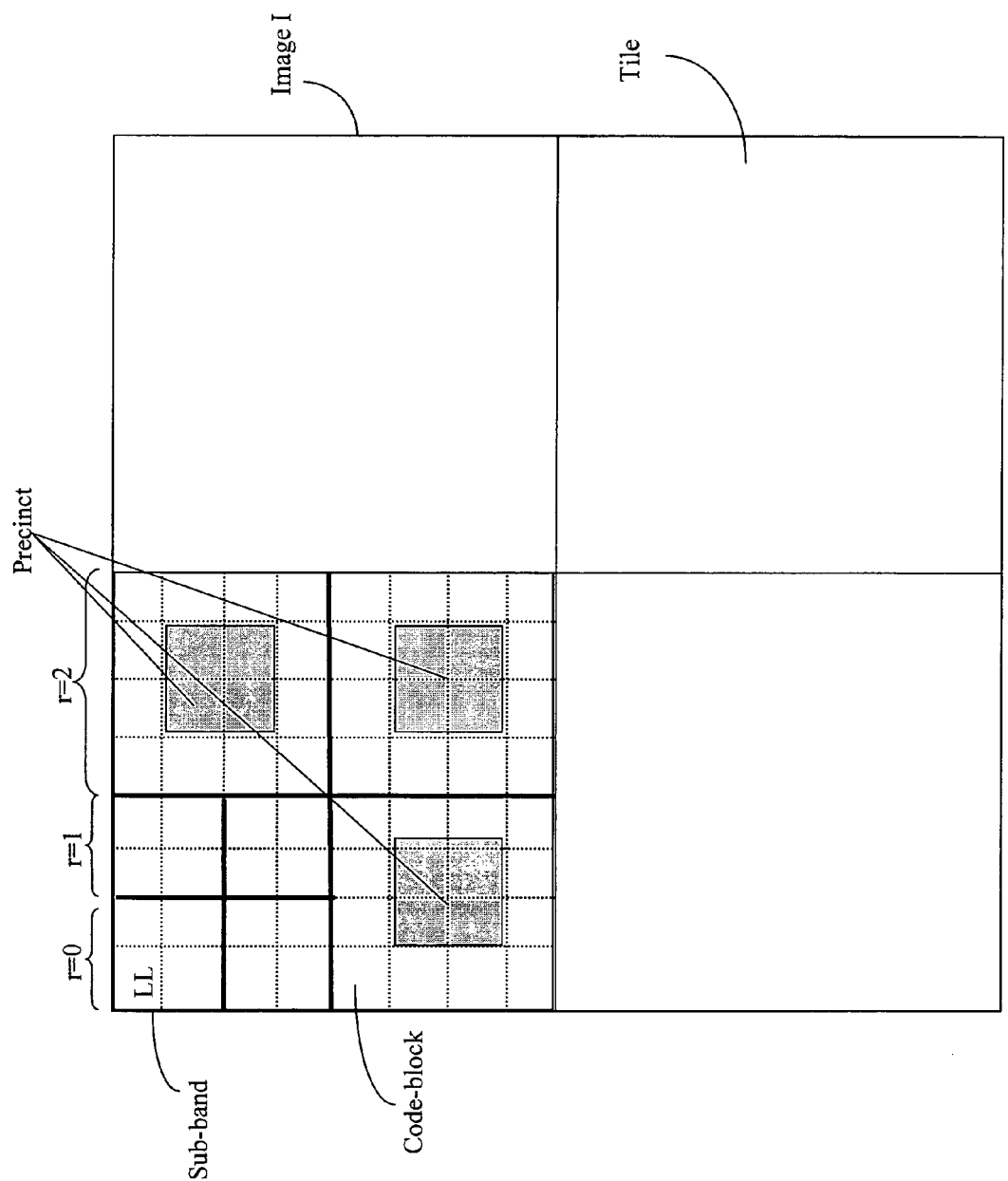
FIG. 2 shows the representation of an image decomposed into frequency sub-bands and partitioned into four tiles.

As shown diagrammatically in FIG. 2. an image I is partitioned spatially, following the JPEG2000 standard, into zones called tiles which are each processed independently for the operation of the compression of the data.

The image of FIG. 2 is partitioned into four tiles which are each decomposed into spatio-frequential frequency sub-bands, but only the tile situated at the upper left of the image illustrates this decomposition.

Such a decomposition into several levels of resolution results, for example, in a discrete wavelet transformation and is well-known to the person skilled in the art.

Also in known manner, the frequency sub-bands of the same size in the representation given in FIG. 2 all correspond to the same resolution level for different spatio-frequential orientations.

The operation of compressing the data of the image is based on th division of the frequency sub-bands into smaller data units, called code-blocks, which are blocks of data.

These code-blocks are rectangular subsets of coefficients resulting from the transformation into frequency sub-bands which are defined within each sub-band.

When the compressed bitstream is formed, it is possible to re-group the code-blocks of the frequency sub-bands which correspond to the same spatial localization or precinct within the same resolution level.

Figure 3:
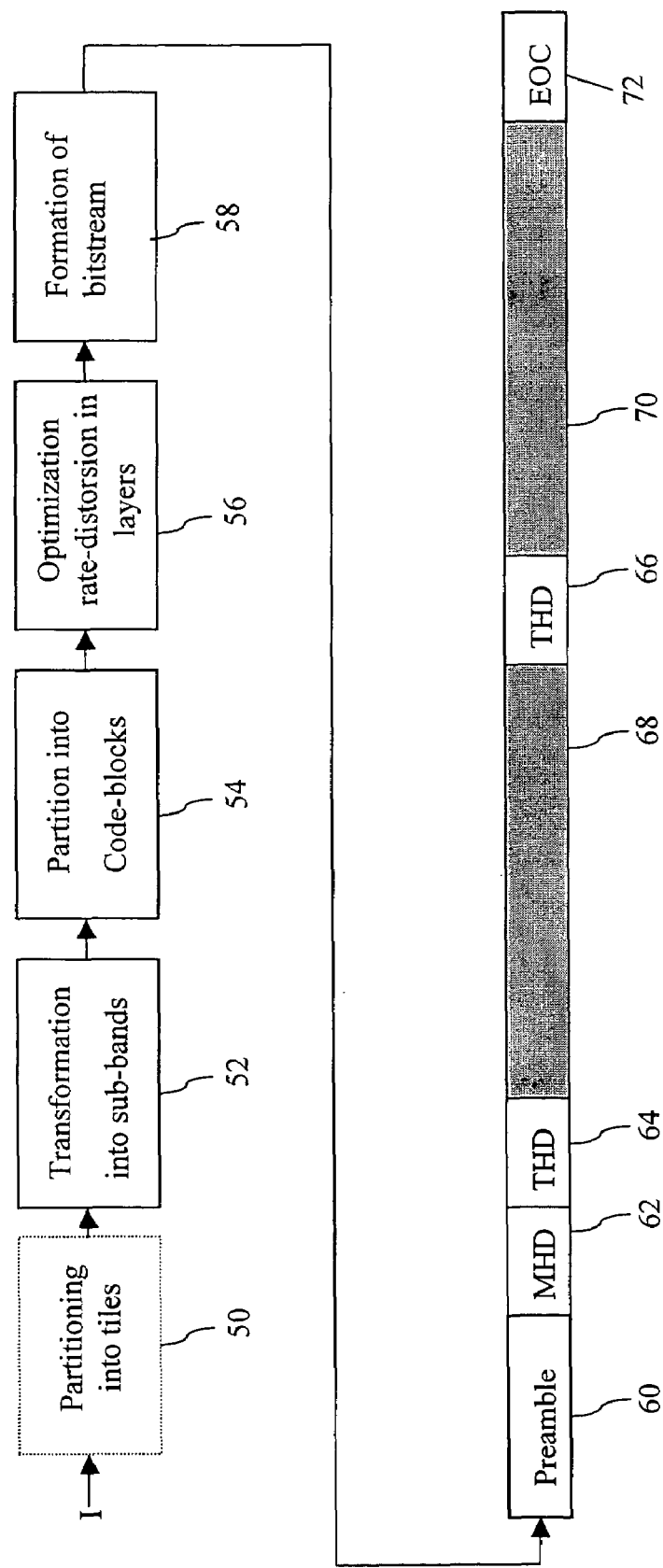
FIG. 3 is a diagram of the formation of a compressed bitstream conforming to the JPEG2000 standard.

FIG. 3 illustrates very diagrammatically the formation of a bitstream compressed in accordance with the JPEG2000 standard.

An initial image I first of all undergoes an operation of spatial partitioning into zones of the image or tiles 50, then an operation 52 of spatio-frequential transformation into frequency sub-bands (for example, by a discrete wavelet transformation).

Further to the transformation operation 52, coefficients representing each tile in the spatio-frequential domain are obtained and which are next, during an operation 54, partitioned into code-blocks as illustrated by FIG. 2.

A following operation 56 provides for the application to the image of an algorithm for rate-distortion optimization for each quality layer, which makes it possible to obtain the best contribution of e ch code-block in terms of rate, at each quality layer.

The final operation 58 consists in forming the bitstream of th image in accordance with the description syntax provided in the JPEG2000 standard, as described in the document "JPEG2000 image coding system ISO/IEC 15 444-1. 2000".

As shown in FIG. 3, the bitstream of the compressed image signal conforming to the JPEG2000 standard comprises first of all an optional preamble 60 containing metadata, such as the image identifier, the author of the image, etc., and a set of compressed data known as the codestream comprising main header date (MHD) 62 and at least one tile.

In FIG. 3 two tiles have been shown.

Each tile is composed of tile header data 64 and 66 and a set of data 68 and 70 of compressed images known as a tile-part bitstream.

Each tile-part bitstream comprises a sequence of data packets each containing a packet header and a packet body.

The body of each packet comprises the data blocks mentioned earlier and which are each compressed into several incremental levels or layers of quality: a base layer and several layers of refinement.

It will be noted that the header of each packet contains both the list of the code-blocks contained in the packet under consideration, as well as the parameters of compression relating to each code-block.

Each level or layer of quality of a code-block is contained in a distinct packet.

Thus, a data packet contains a set of code-blocks corresponding to a given tile, component, resolution level, quality level and precinct.

In the context of the embodiment of the invention presented here and applied to the signals of images conforming to the JPEG2000 standard, the minimum data transmitted between the communication apparatuses of FIG. 1 over the distributed network are the data packets described above.

Figure 4:
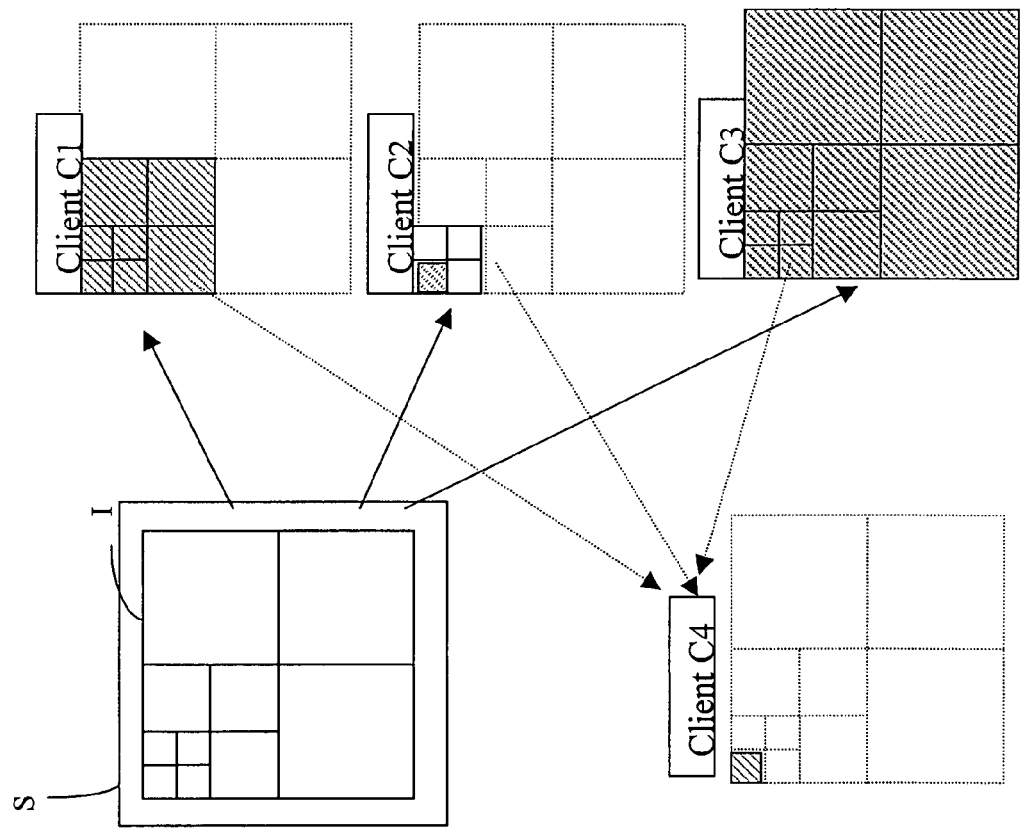
FIG. 4 is a diagram of the data exchanges in a distributed communication network comprising a source apparatus and client apparatuses C1, C2, C3 and C4.

FIG. 4 which follows illustrates the transmission of data making up an image signal with several resolution levels between several communication apparatus s including a so-called source apparatus, denoted S, on which is stored an image signal I, and several communication apparatuses referred to as client apparatuses and denoted C1, C2, C3 and C4.

These communication apparatuses have the structure of those represented in FIG. 1 and each comprises a device according to the invention.

This Figure thus illustrates the exchanges of data in the case of sharing a multi-resolution image signal in a distributed network.

It will be noted that the image I is that which was described with reference to FIG. 2 which thus has three resolution levels.

In the example embodiment described it is considered that, when all the apparatuses C1, C2, C3 and C4 are connected to the source apparatus S via the distributed network, they all receive from the latter a part of the image signal I which corresponds to the low frequency sub-band of this signal, thus constituting the minimum of information shared by all the communication apparatuses.

The sending of this part of the image informs the apparatus of the availability of the identified signal in the network.

A first descriptor representative of the identified digital signal is also sent by the source apparatus S.

The apparatuses C1, C2, C3 and C4 are also referred to as recipient apparatuses.

This part of the signal of very low resolution is called a thumbnail.

Each of the client or recipient communication apparatuses C1, C2, C3 and C4 may view the part of the image signal thus received and then take a decision as to whether supplementary data (other parts of the image signal) are necessary far the apparatus concerned.

More particularly, each apparatus has the possibility of increasing the resolution of the part of the image signal already received, for example, by requiring the high frequency sub-bands of each resolution level and/or by requesting more details concerning the part of the image signal received.

Furthermore, the user may extract a spatial zone of the image signal at a given resolution and/or quality level.

It should be noted that the image signal I does not necessarily have a multi-resolution format and the part of the sign I received by the apparatuses C1 to C4 may, for example, correspond to a spatial zone of the image.

Later an one or more apparatuses may thus wish to receive another spatial zone of the image or else to receive more in relation to the first zone received.

In FIG. 4, cross-hatched zones at each of the recipient or client apparatuses C1, C2, C3 and C4 have been used to represent the data of the signal of image I which are present locally in the apparatus concerned.

Thus, the representation in FIG. 4 assumes that each of the client or recipient apparatuses has received the above-mentioned thumbnail from the source apparatus and has then taken a decision based on that thumbnail to send out a request to the source apparatus S for obtaining supplementary data.

However, in the example considered, the recipient apparatus C4 was not connected when the sharing of the image signal was carried out by the source apparatus S and it has only received the thumbnail.

Furthermore, in the case in which the apparatus C4 was not connected at the moment when the source apparatus transmitted the thumbnail to all the recipient apparatuses which were connect, the apparatus C4 may, later, retrieve this thumbnail from the apparatus 20 of FIG. 1 which is permanently connected and which acts as central server.

For example, the recipient apparatus C1 has received two complete resolution levels out of three of the resolution levels of the image signal, whereas the recipient apparatus C2 has only received the first resolution level.

With regard to the recipient apparatus C3, this has received the entire image signal.

When apparatus C4 is connected, then the source apparatus S is disconnected and apparatus C4 must therefore resort to the recipient apparatuses C1, C2 or C3 to retrieve the supplementary data which it is missing with respect to the data making up the part of the signal which it has already received.

To do this, the invention makes provision for supplying the recipient apparatus C4 with information on the image signal I as well as on the parts of the signal present locally on the recipient communication apparatuses C1, C2 and C3 which constitute potential servers.

The invention provides more particularly to have recourse to two descriptors stored in a local storage and related to a unique identifier of the digital signal: a first descriptor representative of the identified digital signal and a second descriptor which is dependent on the first descriptor and representative of the data locally present on a communication apparatus.

Furthermore, the second descriptor may also provide the position or address, in a local memory of the apparatus concerned, of the data which are present locally on that apparatus.

It will be noted that, according to a particular approach, the invention makes provision in the source apparatus S for having a first descriptor and an image signal descriptor (second descriptor) which represents the local presence on that apparatus of all the data making up the image signal.

Both descriptors present on the source apparatus S are transmitted to the different communication apparatuses C1, C2, C3 and C4 on the transmission of the thumbnail or else the second descriptor is transmitted solely to the apparatuses C1, C2 and C3 when they require supplementary data in addition to the thumbnail already received with the first descriptor.

When the recipient apparatus receives the second signal descriptor, two cases are to be envisaged:

1) Each apparatus uses the image signal descriptor (second descriptor) as a descriptor of data representing data locally present on the apparatus concerned.

This descriptor is updated in such a manner as to be representative of the local presence of all or part of the data making up the signal which have been received and stored by that apparatus.

2) Each recipient apparatus receiving the image signal descriptor (second descriptor) from the source apparatus creates another data descriptor, called the local descriptor, which it updates such that the latter is representative of the local presence of all or part of the data making up the signal which have been received by that apparatus.

More particularly, the data descriptor is created in the form of a hi rarchical description map, that is to say which presents a hierarchical organization of the data concerned.

The representation of a local descriptive map in hierarchical or linear form will be described later with reference to FIGS. 6, 7 and 10.

Furthermore, later on at the time of the description made with reference to FIGS. 12a-f and 13, we will come back to the use of the data descriptors within the distributed network based on the example represented in FIG. 4, once all the mechanisms necessary to the understanding of the invention have been described.

Figure 5B:
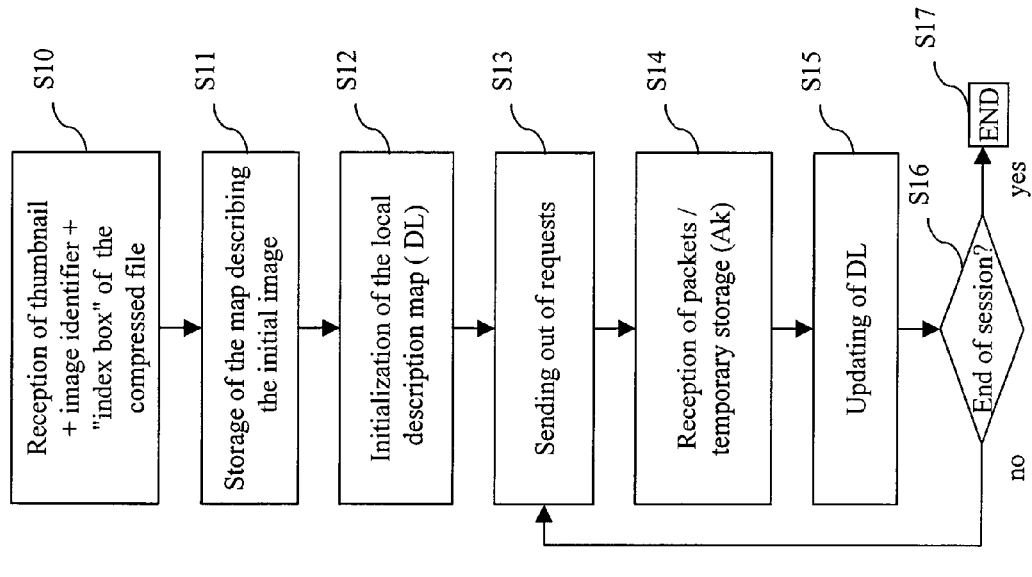
Figure 5A:
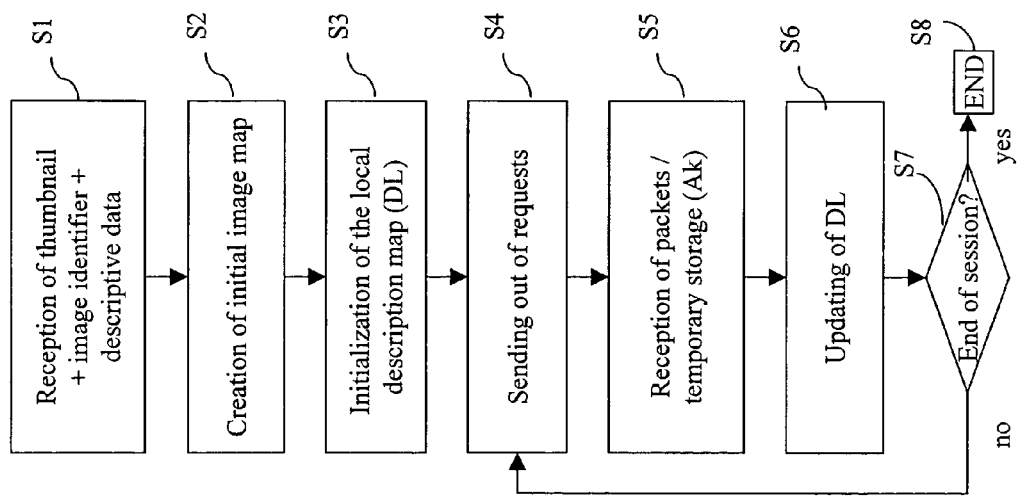
FIG. 5a illustrates an algorithm for implementation of the method according to the invention.

FIG. 5a illustrates an algorithm comprising different instructions or portions of software code corresponding to steps of the method according to the invention.

Figure 14:
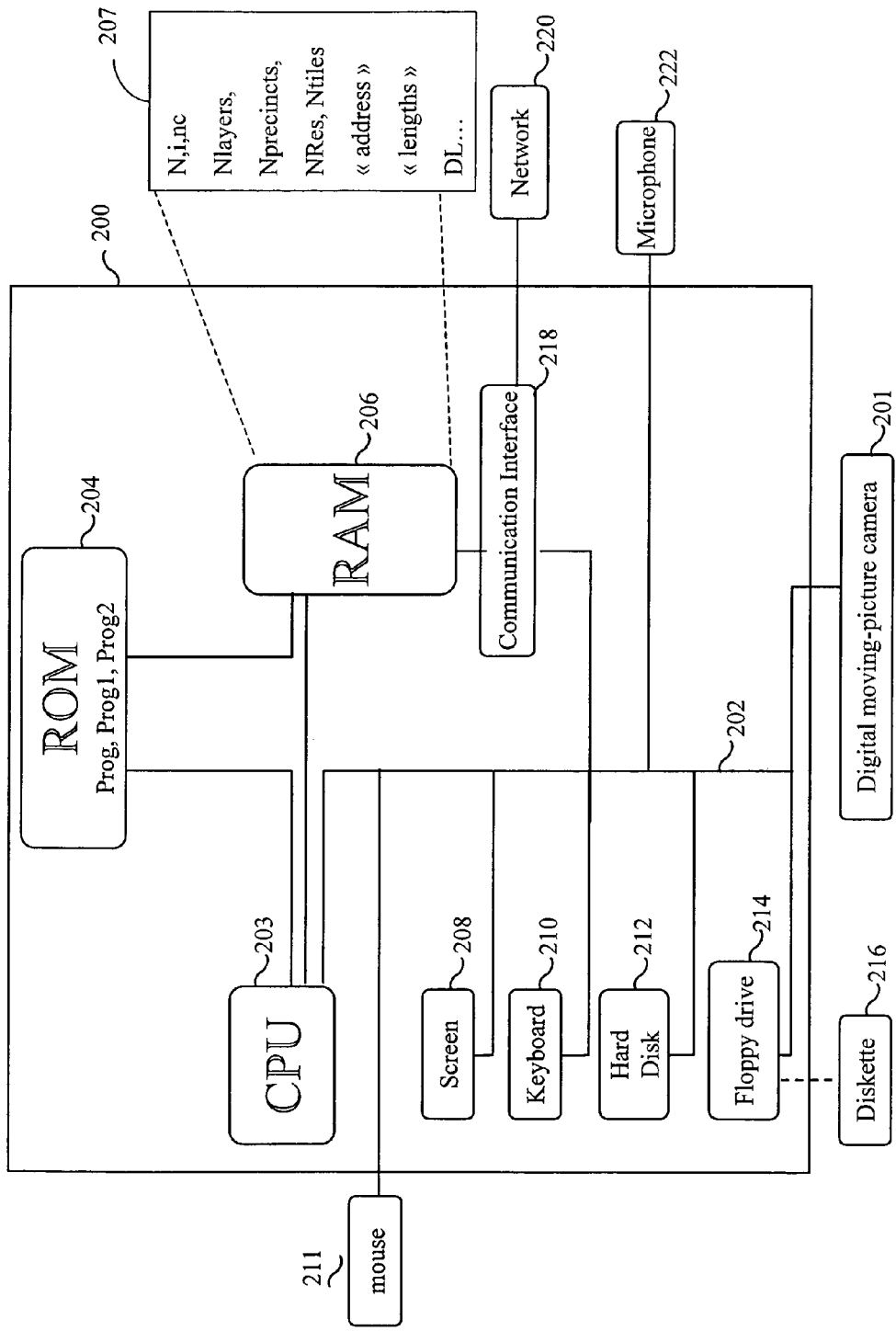
FIG. 14 is a diagram of a programmable apparatus implementing the invention.

The computer program which is based on this algorithm forms part of a program denoted "Prog" which is stored on the apparatus according to the invention of FIG. 14.

The algorithm of FIG. 5a is implemented by each communication apparatus connected to the distributed communication network, at the time of a communication session in client mode, The algorithm comprises a step S1 of receiving a part of the image signal which is, in the example considered, a low resolution version of the image signal, also termed thumbnail.

During this step, the communication apparatus also receives information representing the structure and the organization of data in the image signal, parameters necessary for the decoding and the displaying of the thumbnail, as well as a unique identifier of the image which is for example the name or the reference of the image under consideration (first descriptor).

In the case of an image signal in accordance with the JPEG2000 standard, the information representative of the structure and of the organization of the data in the signal are contained in the main header 62 of the bitstream represented in FIG. 3, as well as the headers of tiles 64 and 66.

Among the header data mentioned above, the following information is to be found which is used in particular in the recipient communication apparatus:

size of the image (height and width), size of the tiles, position of the tiles in the reference grid, number of components (supplied by the markers denoted SIZE in the JPEG2000 standard).

information useful on decoding (number of resolution levels, number of quality levels or layers, order of progression in the bitstream, quantization parameters) which are provided by markers COD, COC, QCD and QCC of the JPEG2000 standard, as well as the markers POC and RGN to the extant that they are present.

The above-mentioned received data are locally stored in the apparatus.

The communication apparatus that is recipient of this information coming from the source communication apparatus uses this information to construct a skeleton representing the signal of image I and of the file compressed in JPEG2000 format corresponding to this image signal.

To do this, the information received must contain the number of the data packets of the signal of image I, as well as the ordering of these packets according to the order of progression adopted.

It may also be useful to receive the information as to the size of these packets in the compressed file.

For this purpose, it should be noted that the JPEG2000 standard makes provision for specifying in the tile header data the length of each data packet present in the tile under consideration by introducing optional markers denoted PLM and PLT.

The algorithm of FIG. 5a comprises a following step S2 of creating a descriptor (second descriptor) of the initial signal of image I, in the form of a descriptive map, based on the information representing the structure and the organization of the data in the signal and which were already received at step S1.

It will be noted that this step is only carried out in the case of a first communication session in client mode, that is to say when the recipient communication apparatus concerned receives a part of th signal of image I.

This is because if this apparatus has already received a part of the signal of image I this means that it already has a map describing all the data making up the signal of image I.

During the following step S3 of the algorithm, a descriptor of local data or local description map is created which is intended to represent the data locally present on the communication apparatus concerned.

At the time of the first communication session, this map is initialized at step S3 based on the part of the signal received by the communication apparatus concerned, i.e. the thumbnail, and based on the information representing the structure and the organization of the data in the image signal and which were received beforehand.

It will nevertheless be noted that the initialization of this map as a function of the data received is also considered, in the sense of the present invention, as an update of the descriptor of local data, such that it is thereby representative of the local presence of the data which have been received.

As stated earlier, examples of representation of such description maps will be seen later, at the time of the description made with reference to FIGS. 6, 7 and 10.

During the following step S4, the situation is that of a communication session in which one or more requests of data are broadcast for obtaining supplementary data from one or more communication apparatuses connected to the distributed network.

The following step S5 makes provision for the reception of data packets coming from other communication apparatuses connected to the distributed network and for temporary storage of these packets in the cache memory of the apparatus concerned, in the order received.

During the following step S6 updating is carried out of the descriptor of local data produced in the form of a local description map DL such that this map is representative of the local presence of th packet or packets of data just received and stored in a local storage.

The updating of this descriptor of local data will be detailed later at the time of the description made with reference to FIG. 9.

The steps S5 and S6 which concern the processing of the data packets received are repeated until the end of the communication session.

When step S7 detects the end of the communication session, the following step S8 terminates the execution of the algorithm of FIG. 5a.

The algorithm of FIG. 5b represents another embodiment of the method according to the invention whose algorithm is represented in FIG. 5a.

The computer program denoted "Prog1" which is based on this algorithm is stored on the communication apparatus according to the invention represented in FIG. 14.

The algorithm of FIG. 5b comprises a first step S10 which is very similar to step S1 of the algorithm of FIG. 5a.

The difference between the steps S1 and S10 lies in the fact that, at step S10, it is no longer uniquely the information representing the structure and the organization of the data in the signal and the unique identifier of the signal (first descriptor) which are received from the source apparatus by the communication apparatus concerned, but a signal descriptor (second descriptor) coming from that source apparatus and which represents the local presence in the source apparatus of all the data making up this signal.

This signal descriptor is, for example, contained in the file which is, for example, compressed in the format of JPEG2000 standard and which in a way supplies a table of contents describing the content of the file concerned.

This signal descriptor which is in a certain manner an index of the content of the JPEG2000 file contains all the information present in the header data (main header and tile header when the signal is partitioned into tiles), as well as the size of the compressed data packets (in the case in which the image signal is compressed) and their position in the bitstream.

The items of information contained in the signal descriptor are thus more numerous than those received at step S1 and which represent the structure and the organization of the data in the signal.

This signal descriptor is, for example, stored with the file compressed in JPEG2000 format apart from the header daft and the compressed data which are indicated in FIG. 3.

The algorithm next comprises a step S11 of storing a description map of the signal of image I which is none other than the above-mentioned signal descriptor or index.

The following steps S12, S14, S15 and S16 are identical to the respective steps S3, S5, S6 and S7 of the algorithm of FIG. 5a and will therefore not be described again here.

Step S13 differs from step S4 in that the request is notably issued as a function of the first and second descriptors.

However, it should be noted that the above-mentioned signal descriptor could be used during the step S12 of initializing a descriptor of local data (local descriptor map DL) in that the signal descriptor would also serve as descriptor of local data.

Thus, at the communication apparatus concerned there would only be available a data descriptor which would be the signal descriptor and which would thus both represent all the data making up this signal, as well as represent the data present locally on the apparatus concerned.

According to this variant, in case another communication apparatus were to request the communication apparatus concerned for its local information, then it would be the signal descriptor which would be transmitted to it to inform it in particular of the local presence of certain data of the signal.

Furthermore, this may prove to be very useful when this other apparatus which transmits the request only has a part of the image signal (thumbnail) but has received neither the signal descriptor of the source apparatus nor information representing the structure and the organization of the data in the signal.

Nevertheless, according to the algorithm of FIG. 5b, two different data descriptors are used, one being the signal descriptor received from the source apparatus and the other being the descriptor of local data created in the communication apparatus receiving the signal descriptor and a part of the signal.

Moreover, it should be noted that it is possible, within a distributed network of the type of that of FIG. 1 or 4, to encounter communication apparatuses in which, on the one hand, the descriptor of the image signal received from the source apparatus is stored (step S11), and, on the other hand, another data descriptor representing the local presence of data is created (step S12), it being one or the other of these aforementioned data descriptors which is transmitted to one or more other communication apparatuses according to the case envisaged.

It is also possible to find, within a distributed network such as that of FIG. 1 or 4, a plurality of communication apparatuses of which certain create their own signal descriptor based on information received from the source apparatus and others receive this signal descriptor from the source apparatus.

Figure 6:
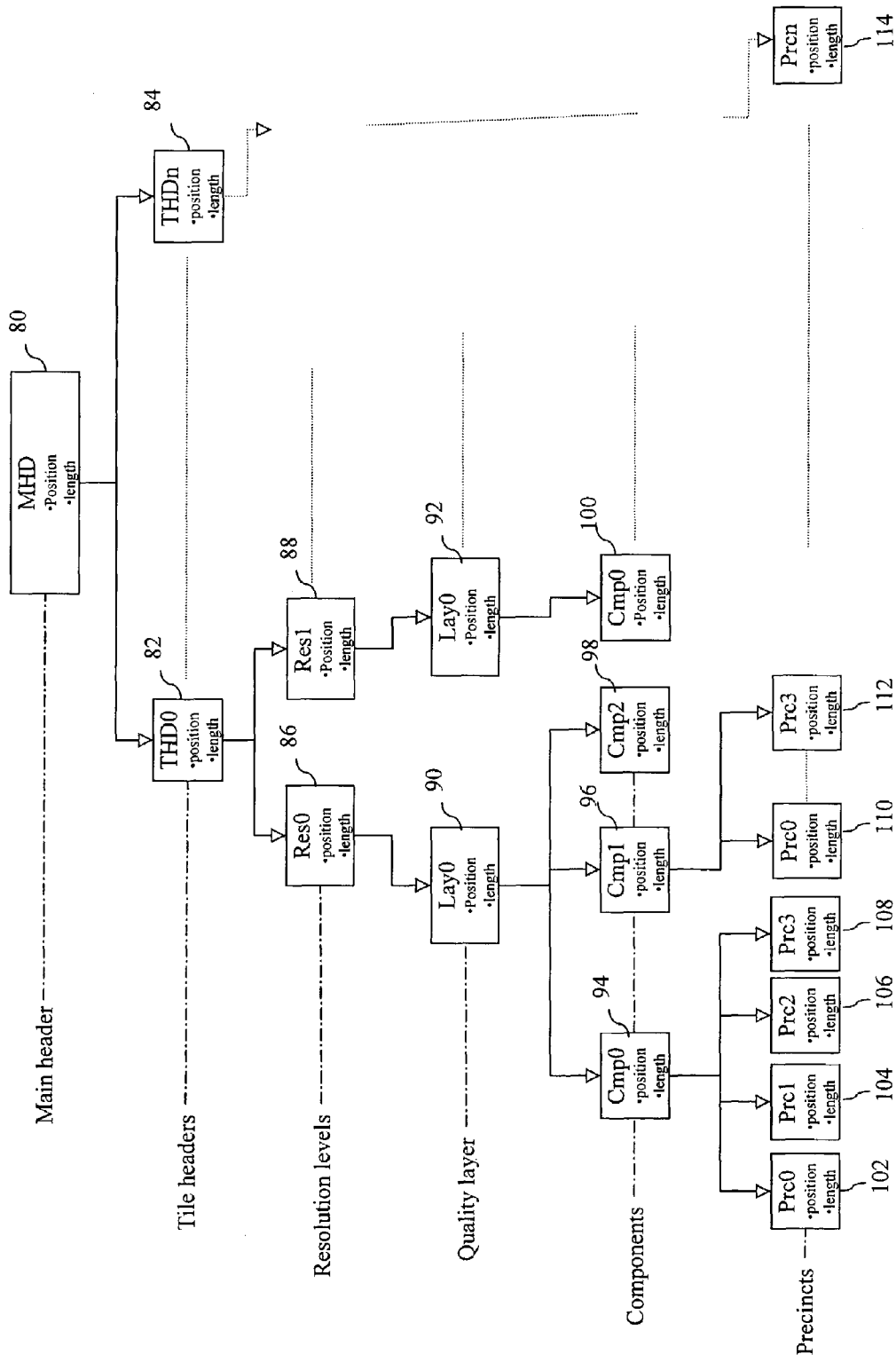
FIG. 6 illustrates a tree representation of a hierarchical data descriptor.

FIG. 6 shows a representation of a data descriptor or map in the form of a tree in which the data are organized hierarchically.

It will be noted that the invention provides for advantageously using the same representation for a descriptor of local data and for a signal descriptor, which is very advantageous on implementation of the algorithm of FIG. 5b.

It should be noted that the hierarchical nature of the organization of the data in the descriptor or descriptive map is explained by the fact that the data are organized in a tree which has nodes corresponding to semantic entities of the bitstream for example in JPEG2000 format.

The hierarchical representation proposed by FIG. 6 is organized following the order of progression of the data packets encountered when the bitstream represented in FIG. 3 is gone through.

As in the example of FIG. 3, it is assumed that the image signal is partitioned into a plurality of zones or tiles and the data packets of the signal are ordered in the order of progression "resolution-quality layer-component-position".

Thus, the highest node in the tree (root nod) corresponds to the main header data of the bitstream represented in FIG. 3 and is referenced 80, then the following nodes, positioned in the tree at the hierarchical level immediately below, correspond to the header data of zones or tiles and are referenced 82 for THD0 and 84 for THDn.

Within the same tile, for example the tile T0, the data packets are grouped together by resolution level and in the tree, at the hierarchical level immediately below, are to be found the nodes corresponding to the resolution levels 0 and 1 for the tile T0 respectively referenced 86 and 88.

At the hierarchical level immediately below in the tree are next found the nodes corresponding to the quality layers for a resolution level under consideration and which are here respectively referenced 90 and 92 for each of the respective resolution levels 0 and 1.

It will be noted that the quality layer whose node is referenced 90 corresponds to the quality layer 0 and that, naturally, the resolution level 0 may contain other quality layers which then appear in increasing order within their respective resolution level.

At the hierarchical level immediately below that of the quality layers, the nodes are to be found which correspond to the components which are three In number and referenced 94, 96 and 98 for the quality layer 0 of the resolution level 0 and which are three in number for the quality layer 0 of resolution level 1, of which the only component, referenced 100, is shown in the Figure.

Finally, at the end of the tree are to be found what are commonly called the leaves of the tree represented at the last hierarchical level and corresponding to the spatial positions (precincts).

Thus, for the component 0 denoted 94 four precincts 102, 104, 106 and 108 are found.

Similarly, for the component 1 denoted 96 four precincts are to be found of which only the first 110 and the last 112 are represented.

In an identical manner, for the other tiles and in particulor for the tile whose head or data 84 THDn are represented in FIG. 6, th same types of nodes are found, at each hierarchical level of the tree, as far as the leaves corresponding to the precincts of which only one precinct denoted 114 has been shown.

It should be noted that the leaves of the tree of FIG. 6 correspond to data packets of the bitstream under consideration.

Furthermore, the header data 80, 82 and 84 contain the information on position and length of the header data respectively considered.

The other nodes of the tree contain the following information:
 the index of the semantic element with respect to the nodes of the tree having the same parent node; thus, for example, for the layer of quality 0 of the resolution level 0 of the tile T0, the nodes of components 94, 96 and 98 are indexed from 0 to 2.
 the position of the semantic element which indicates the address at which the semantic entity considered begins in the bitstream of the signal;
 the length of the semantic element in number of octets in the bitstream.

It should moreover be noted that the leaves of the tree contain the values of length of the data packets which they represent.

Figure 7:
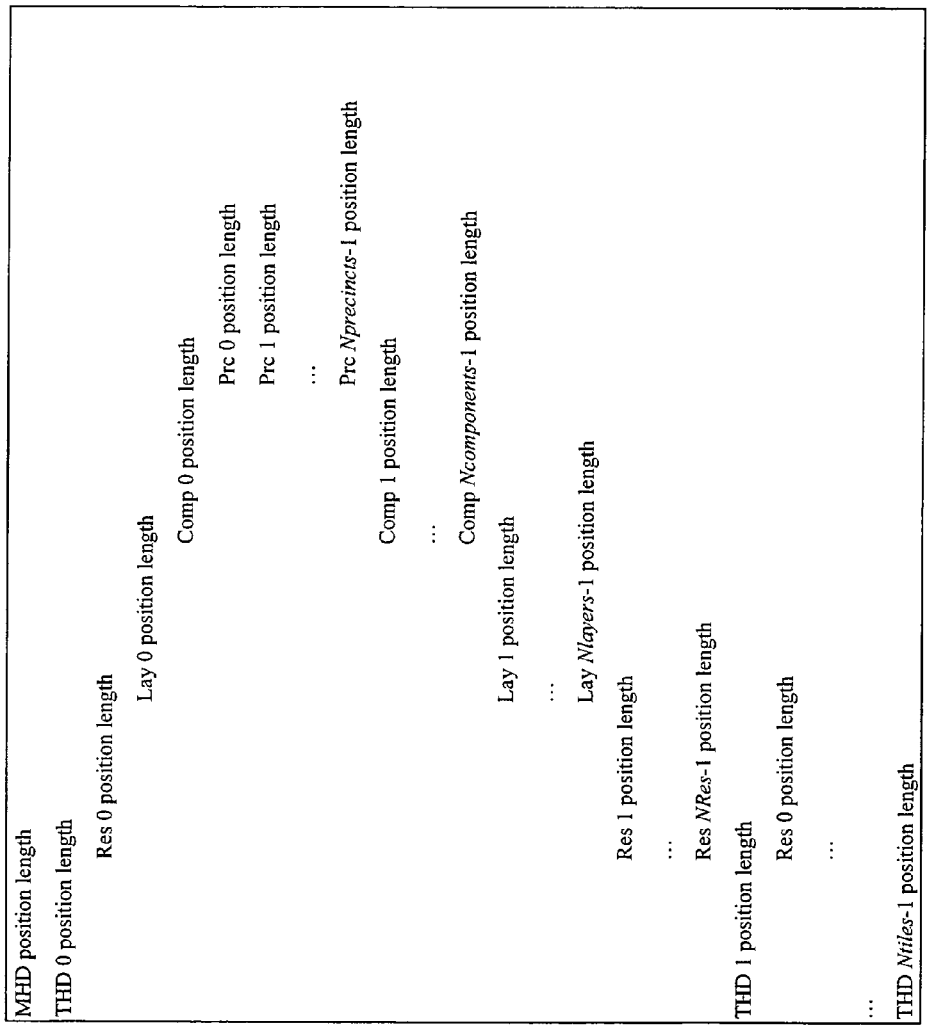
FIG. 7 illustrates the hierarchical representation of a data descriptor in the form of a text file.

FIG. 7 provides a possible formulation, in the form of a text file, of the data descriptor whose hierarchical representation is illustrated in FIG. 6.

As previously set out for the description of FIG. 6, each semantic entity of the tree of FIG. 6 has a position value and a length value attributed to it.

It will be remarked that the structure of the text file represented in FIG. 7 does not exactly agree with the semantic entities represented in FIG. 6 in that the tiles 0, 1 and Ntiles-1 have been indicated and in that, for the tile 0, therefore have been considered in a general manner the resolution level 0, 1 as far as Nres-1. the quality layers 0, 1 as far as the number Nlayers-1, the components 0, 1 as far as Ncomponents-1 as well as the precincts 0, 1 as far as the number Nprecincts-1.

It must also be noted that a data description map may also be defined, for example in XML form or in binary form without this affecting the principle of the invention.

It should be noted that the hierarchical structure represented in FIG. 6 is particularly appropriate for describing the image signal which conforms to the JPEG2000 standard in that this structure uses all the semantic entitles specified in that standard.

Figure 8:
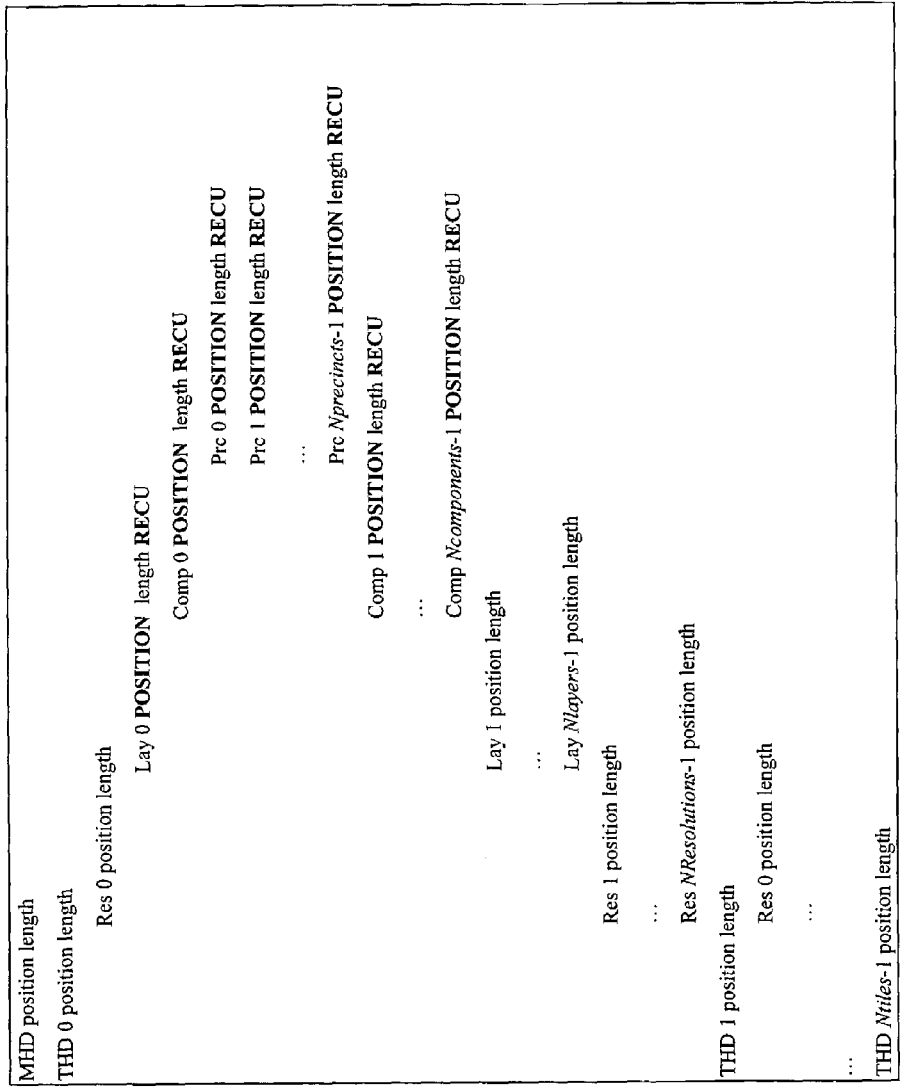
FIG. 8 illustrates the hierarchical representation of a hierarchical descriptor of local data in the form of a text file.

FIG. 8 illustrates a possible type of local data descriptor or local description map when a descriptor or hierarchical map is used to describe the signal of image I.

Furthermore, this Figure also illustrates the manner in which the local data descriptor is updated to show the state of the cache memory of the communication apparatus considered, that is to say in order to represent the local presence of data in that apparatus.

The creation of a descriptor of local data or DL map is provided for in steps S3 and S12 of the respective algorithms of FIGS. 5a and 5b and consists in an initialization of that descriptor.

More particularly, the initialization of this descriptor is performed by copying 'as is' the descriptor of image signal I which is represented in FIG. 7.

Consequently, the initial version of the descriptor of local data coincides with that of the signal descriptor represented on that FIG. 7.

Following this, when the communication apparatus receives data packets coming from one or more other communication apparatuses, as is specified in steps S4 and S13 of the respective algorithms of FIGS. 5a and 5b, these packets are stored in the cache memory of the apparatus under consideration.

Furthermore, the semantic elements of the descriptor of local data representing these packets (these elements correspond to the precincts which are the leaves of the tree represented in FIG. 6) are modified on the updating of the descriptor.

More particularly, the address of the data packet which was received and stored in cache memory of the apparatus is indicated in the descriptor of local data DL by modifying the position field of the packet considered.

The position of the data packet considered in the storage space replaces the former position value which was present in the descriptor of local data.

Thus, the updating of the descriptor of local data makes it possible for the latter to represent the position of the packet considered in the memory of the apparatus.

Furthermore, the packet considered is signaled as having been received by the communication apparatus concerned thus it is locally present in the latter.

To do this, it is provided to indicate the term "RECU" in the descriptor of local data represented in FIG. 8.

As FIG. 8 shows, it can be seen that all the data packets for the tile 0, the resolution level 0 and the quality layer 0 have been received by the communication apparatus considered. Consequently, all the position fields of the hierarchical level corresponding to the quality layer 0, the hierarchical levels corresponding to components 0, 1 as far as the number Ncomponents-1, as well as the hierarchical levels corresponding to the precincts 0, 1 as far as the number Nprecincts-1 for each of the components have been modified.

A simple consultation of the file considered thus makes it possible very rapidly to determine the presence or the absence of certain data packets of the image signal.

The presence of the label "RECU" for the component nodes and that of the quality layer 0 at the resolution level 0 of the tile 0 indicates that the communication apparatus concerned has received all the data packets corresponding to these components and thus to that quality layer.

We will return later, with reference to FIG. 9, to the updating of the descriptor of local data.

It should be noted that it is not necessary to modify the length fields present in the descriptor of local data in that the length of the packets received remains unchanged with respect to those indicated in the image signal descriptor or image descriptive map.

Moreover, when a semantic entity of the bitstream in JPEG2000 format is marked as having been received in the descriptor of local data and when the mechanism of re-ordering the packets which have been received (this mechanism is explained with reference to FIG. 10) has been executed, then the length field of the entity considered is valid.

This field indeed represents the length of the semantic entity in the bitstream which is stored in the cache memory of the communication apparatus considered.

Figure 9:
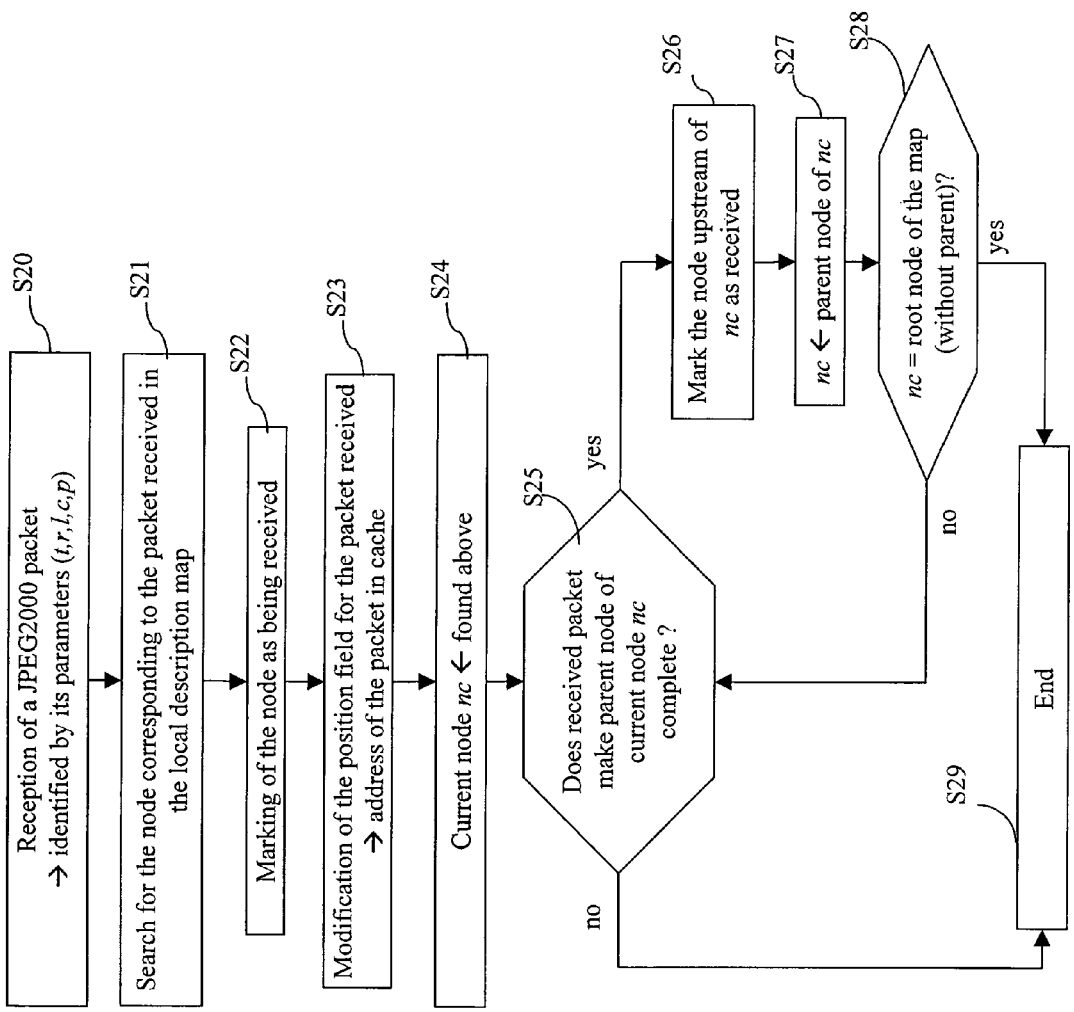
FIG. 9 is an algorithm for updating a hierarchical descriptor of local data.

The algorithm of FIG. 9 generally concerns the updating of the hierarchical descriptor of local data described above, at a communication apparatus receiving data.

This algorithm details more particularly the steps S5 and S6 of the algorithm of FIG. 5a and, in corresponding manner, the steps S14 and S15 of the algorithm of FIG. 5b.

The algorithm of FIG. 9 forms part of the algorithm of FIG. 5a and of that of FIG. 5b and the computer program "Prog", as well as the program "Prog1" are also based in part on that algorithm.

The algorithm of FIG. 9 proposes an updating of the descriptor of local data progressively with the reception by the communication apparatus concerned of the compressed data packets.

For each data packet received by the communication apparatus, the algorithm of FIG. 9 is executed to update the descriptor of local data.

This algorithm commence with a step S20 of receiving a data packet which is identified by its parameters of tile t, of resolution level r, of quality layer l, of component c and of precinct p.

During the following step S21 the algorithm provides for searching in the hierarchical descriptor of local data the node which corresponds to the packet P (t, r, l, c, p) received.

To do this, the descriptor of local data DL represented in FIG. 8 is gone through until the tile t is reached, then it is continued to go through the descriptor successively until reaching the resolution level r, quality level l, component c and precinct p.

Once the node corresponding to the precinct p of the component c, of the quality layer l, of the resolution level r of the tile t has been reached, the search is terminated.

The following step S22 provides for marking the node nc found which represents the packet received by the apparatus, this marking indicating that the packet has been received in the hierarchical descriptor of local data DL.

To do this, an indicator or marker "RECU" is then added to this node as shown in FIG. 8.

This makes it possible to signal that the packet P(t, r, l, c, p) is locally present in the communication apparatus considered.

The algorithm next comprises a step S23 of modifying the field "position" of the node nc in the hierarchical descriptor of local data.

As described with reference to the steps S5 and S14 of the respective algorithms of FIGS. 5a and 5b, each packet received is stored in a cache memory of the communication apparatus and, consequently, at this step S23, the position field of the packet received is updated in the descriptor of local data in order to indicate the position or, more specifically, the address of that packet in the local ache memory of the communication apparatus concerned.

It may thus be understood that steps S6 and S15 of the respective algorithms of FIGS. 5a and 5b provide for an updating of the descriptor of local data of the communication apparatus considered, such that the descriptor is at the same time representative of the local presence of data and of the position of these data in the local memory of the apparatus.

The following steps of the algorithm of FIG. 9 provide for updating, if that proves to be necessary, of the nodes of the hierarchical descriptor of local data situated upstream of the current one.

This indeed proves to be necessary in the case illustrated in FIG. 8 in which all the data packets corresponding to the precincts of the same component, which is the component 0 of the quality layer 0 of the resolution level 0 of the tile 0, have been received.

In this case, the updating of the descriptor of local data is continued by marking th component 0 considered as completely received ("RECU") by the communication apparatus.

Thus, the descriptor of local data is updated in such a manner as to be representative of the local presence of all the data packets of this component.

Similarly, when all the components of the same quality layer have been entirely received, as is the case in FIG. 8 for the quality layer 0 of resolution level 0 of the tile 0, then this quality layer can also be marked as being completely received ("RECU").

More particularly, to go through the hierarchical descriptor of local data, by climbing to the upstream nodes, the algorithm provides a step S24 during which the current node is initialized with the leaf corresponding to the packet received which has just been processed.

During the following step S25 a test is carried out in order to determine whether the packet received and which has just been processed renders the node situated upstream (parent node) completely received by the communication apparatus considered.

If so, the following step S26 makes provision for performing marking the node situated upstream (parent node) of the current node nc in order to indicate that this node has been entirely received ("RECU")

In the example of FIG. 8 this step amounts to marking the node "Comp 0" as being received ("RECU").

During the following step S27, the parent node of the current node no then becomes the current node.

The algorithm next comprises a step S28 during which a test is carried out in order to determine whether the new current node is a root node of the descriptor of local hierarchical data, that is to say that it does not have a parent.

If so, the algorithm terminates by a step S29.

In the opposite case, when the current node is not a root node, then step S28 is followed by a step S25 already described.

In the example of FIG. 8 a root node is for example a node corresponding to a resolution level of a tile of the image signal.

In the case in which the test carried out at step S25 is negative then step S25 is followed by the step S29 which terminates the algorithm of FIG. 9.

It should be noted that this algorithm makes it possible to go through the hierarchical descriptor of local data by climbing from the leaves to the root nodes of this descriptor which has the structure of the tree represented in FIG. 6, in order to update the local hierarchical descriptor.

Figure 10:
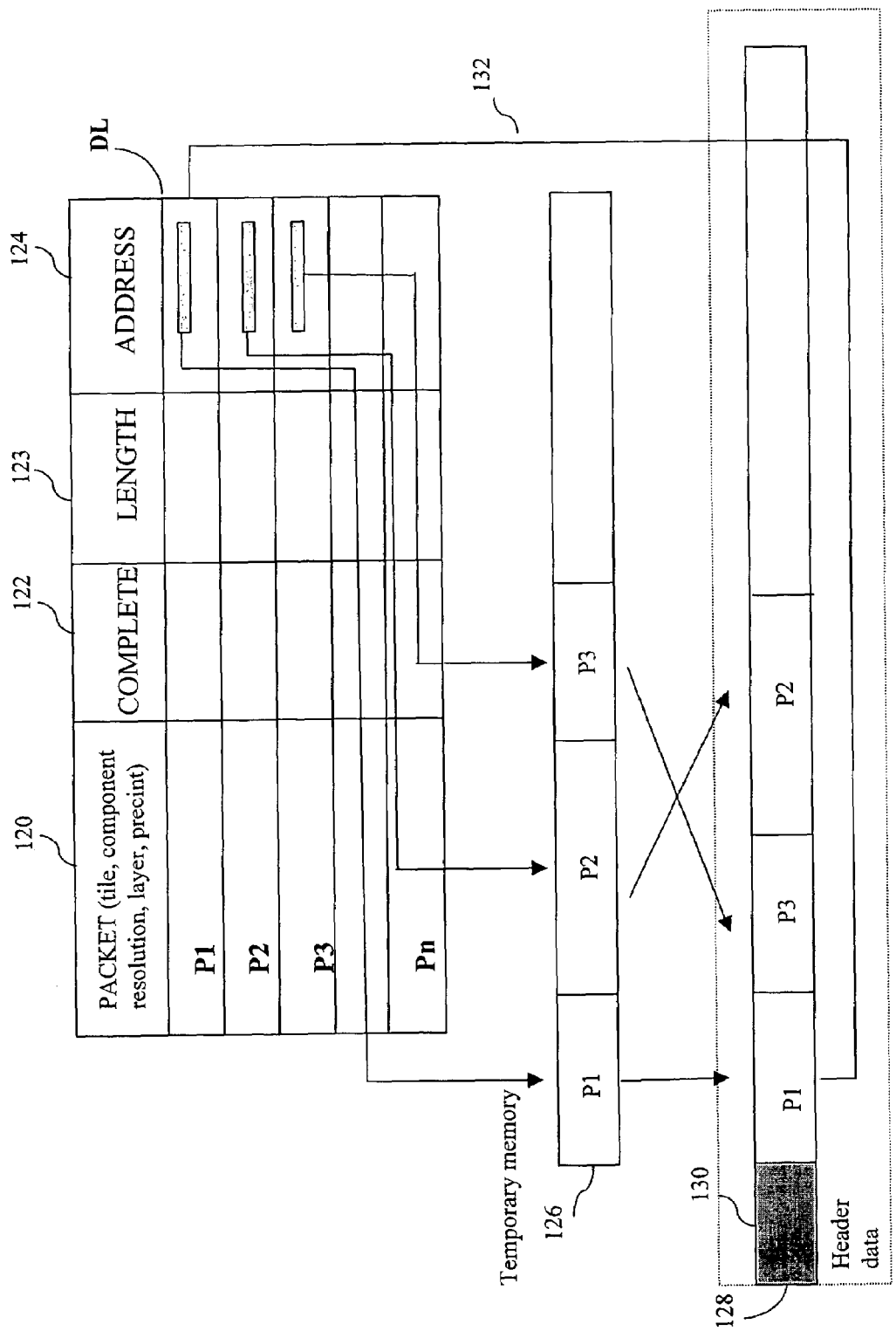
FIG. 10 shows another form of representation of a descriptor of local data (linear representation)

As shown by FIG. 10 it is possible to represent a descriptor of local data DL in which the data, which are packets here, are organized linearly following a predetermined order.

It should be noted that this predetermined order may correspond to the initial order of the packets in the bitstream of the image signal conforming to the JPEG2000 standard, or else the packets may be reorganized as a function of criteria of efficiency of access to the data.

Thus, for example, when the image has been cut up into a plurality of spatial zones or tiles, it is useful to group together the packets P1, P2, P3 . . . Pn of data concerning each resolution of each tile and, for example, to include one after the other all the data packets corresponding to the lowest resolution level of each tile.

This makes it possible to easily reconstitute the low resolution version of an image and thus to respond easily to a request for obtaining this part of the signal.

In the example illustrated in FIG. 10, the packets are ordered in the order of progression tile-component-resolution-layer-precinct in a first field 120.

The descriptor of local data comprises a second field 122 which indicates whether the packet considered has been completely received or not.

In a following field denoted 123 the length of the complete packet is indicated.

It is appropriate for this length information to be received at the moment of the initialization of the data descriptor or at the moment in which the first request concerning a data packet is transmitted or else this information may accompany the packet to which it relates.

The descriptor of local data comprises a last field 124 which provides the address in memory (position of the data at a specific location) of the packet identified in the first field 120.

It should be noted that during a communication session the data packets are stored in a sequential manner in a temporary memory 126 in their order of arrival: P1, P2, P3, etc.

As shown in FIG. 10, at the end of a communication session it is possible to arrange the packets in a predetermined storage order, for example, in order to constitute a file 128 compatible with the description syntax of JPEG2000 format.

We will return later, with reference to FIG. 11, to the creation of such a JPEG2000 file.

Thus, the data packets are re-arranged in memory in the file 128 after writing of the header data 130 in order to form a compatible file.

To do this, for example, the order of storage of the data P2 and P3 in the temporary memory 126 has been inversed in the file 128.

In order for the descriptor of local data DL to be representative, not only of the presence of a data packet in the communication apparatus, but also of the address or position of this packet at a specific location of the bitstream stored in memory in the apparatus, the address corresponding to this packet within the storage file 128 is updated in the descriptor of local data as illustrated diagrammatically by the reference arrow 132 for the packet P-1.

Figure 11:
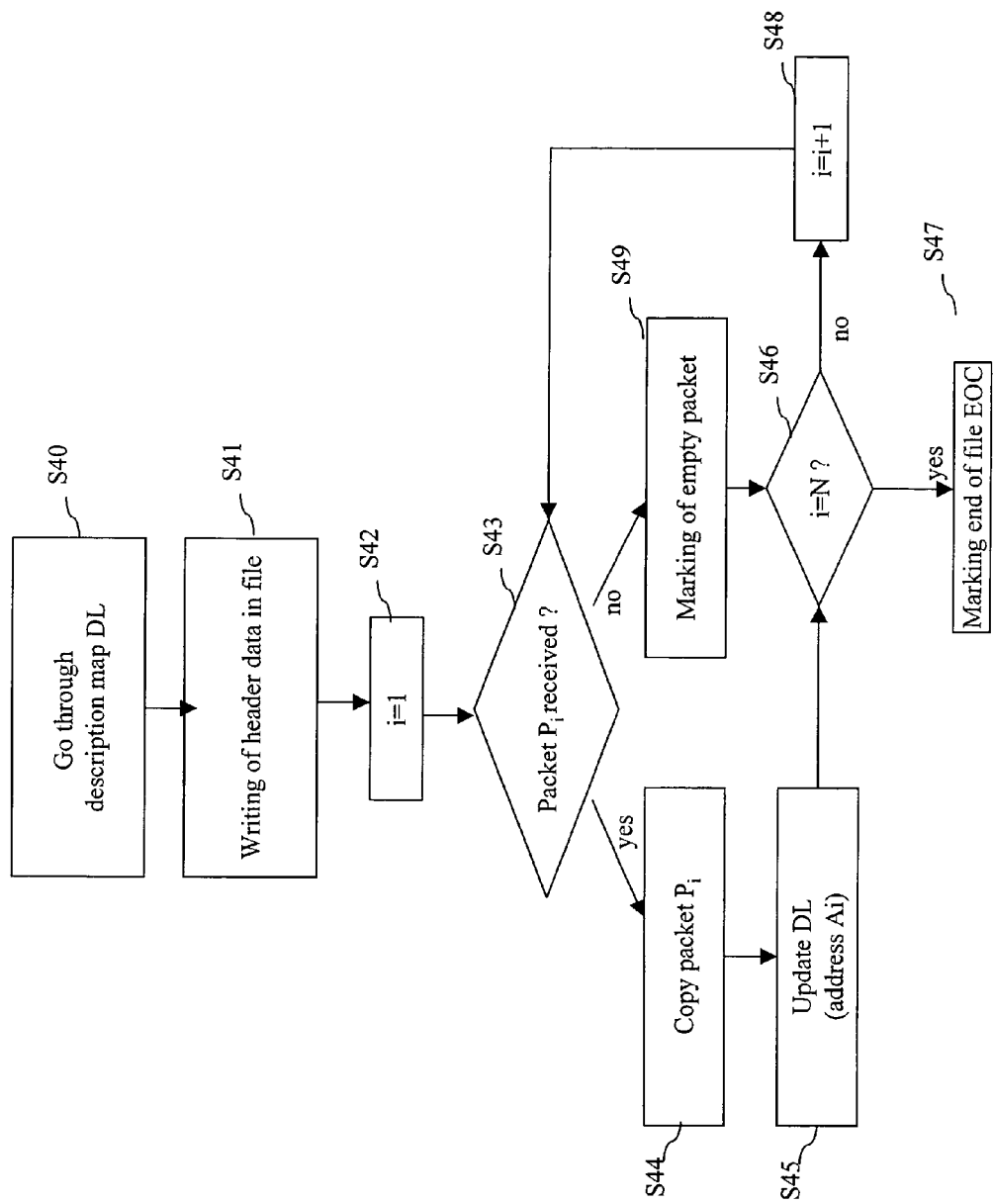
FIG. 11 is an algorithm detailing the operations of creation of a file compatible with the syntax of description in JPEG2000 format.

As disclosed earlier, FIG. 11 represents an algorithm which comprises different instructions or portions of code corresponding to steps of a method of creating a file compatible with the description syntax of JPEG2000 format.

The computer programs "Prog" and "Prog1" mentioned above may also be based on that algorithm for their execution.

It will be noted that the execution of this algorithm is carried out outside the communication session and aims to be able to re-use the data of the image signal received by a communication apparatus of the distributed network.

In parallel with the execution of this algorithm, the descriptor of local data representing the data locally present in the cache memory of the communication apparatus is updated.

This algorithm commences with a first step S40 which provides for going through the descriptor of local data DL (description map).

The object of this step is to identify all the data packets which have been completely received and to deduce from them the values of the fields which are to be filled in the header data, in accordance with the description syntax of the JPEG2000 format.

It will be remarked that it is possible to retain for the final file only the data packets received completely or solely the resolutions received completely and to store in memory, in another location, according to the case, the packets or the resolutions which have been received incompletely.

During the following step S41, the writing is proceeded with of the data identified at the preceding step as header data of the file.

To do this, these data are written in the header of the file in course of construction in the form of markers in JPEG2000 format.

The algorithm next comprises a step S42 during which a counter i is initialized to the value 1 and all the data packets $P_i$ are thus gone through in the descriptor of local data DL.

At the following step S43 provision is made for carrying out a test on each packet $P_i$ gone through in the data descriptor in order to determine whether it has been completely received.

If this is the case, the following step S44 provides for copying this packet $P_i$ into the file in course of construction and stop S45 next provides for updating of the field "address" (position of the data at a specific location) corresponding to the descriptor of local data.

Step S45 is followed by a step S46 during which a test is carried out on the value of the counter l in order to determine whether it is equal to N which represents the total number of packets contained in the image signal.

If that value is reached then step S47 is proceeded to, during which the marker "end of file" is inserted into the file in course of construction, in the form of a marker denot d EOC, which terminates the algorithm.

When to result of the test carried out at step S46 is negative the step S48 is proceeded to during which step the value of the counter i is incremented by one unit and this step is then followed by the step S43 already described.

When the result of the test carried out during step S43 is negative, that means that the packet has not been completely received and it is then marked in the file in course of construction as being empty, during the following step S49.

This step is then followed by the step S46 already described which provides a test on the value of counter i.

Now that the descriptors of local data have been described and that the mechanisms relating to their updating have been set out, we will return to the sharing of a signal, for example, an image signal whose context has already been set out in the description made with reference to FIG. 4.

Figure 12A:
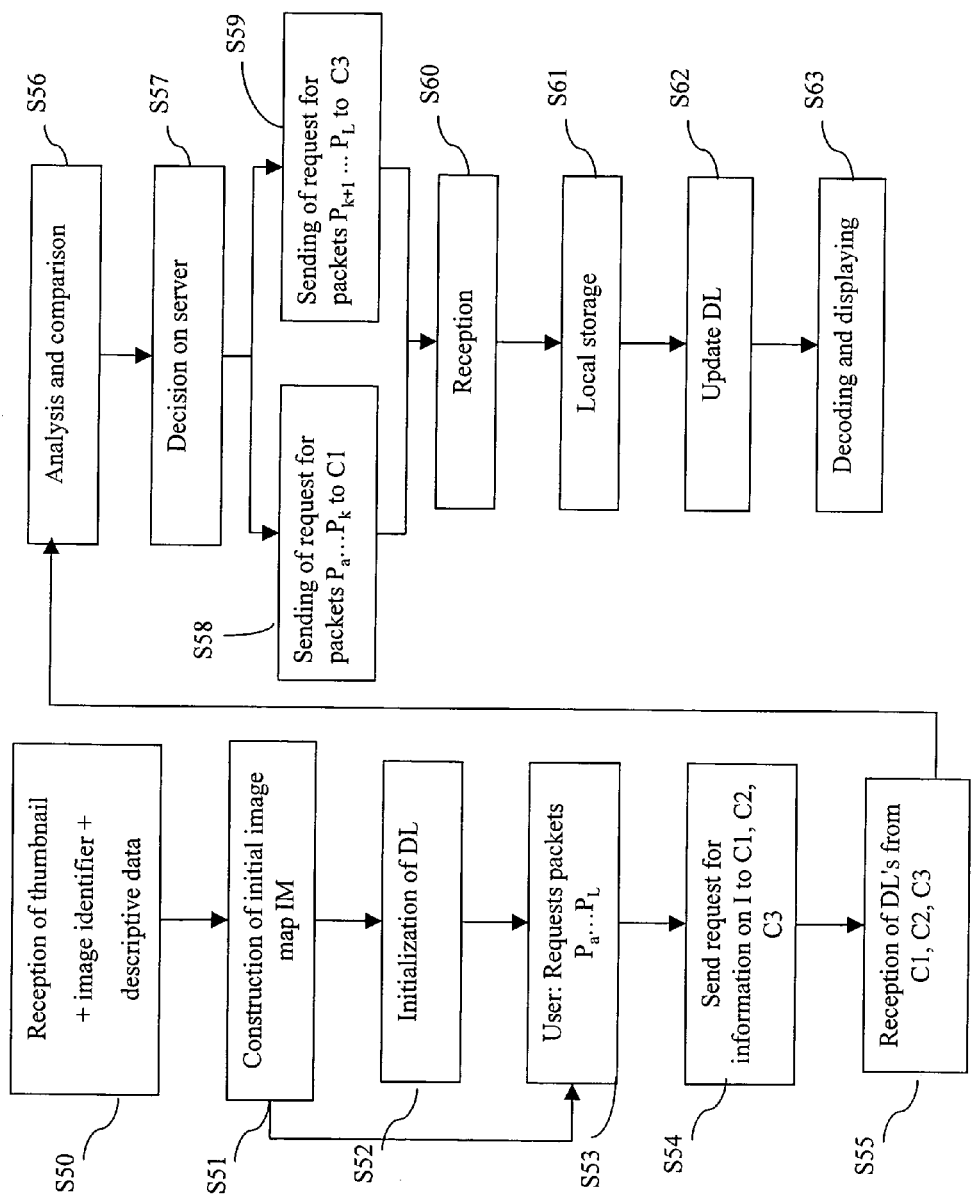
FIG. 12a is an algorithm for implementation of the data processing method according to the invention.

The algorithm of FIG. 12a is implemented at a communication apparatus such as the recipient apparatus or client C4 of FIG. 4.

In this simple example, it is assumed that the user has only sent out a single request.

In this context, it is assumed that the apparatus C4 of FIG. 4 as well as the apparatuses C1, C2 and C3 are all connected via the distributed network and have all received a part of the signal of image i, as indicated by the cross-hatched zones at each level of communication apparatus in FIG. 4.

The algorithm of FIG. 12a comprises instructions or portions of code corresponding to steps of the method according to the invention.

A computer program denoted "Prog2" based on this algorithm is stored in the apparatus or device according to the invention of FIG. 14 and makes it possible, when executed, to implement the method according to the invention.

The algorithm of FIG. 12a commences with a first step S50 during which the communication apparatus C4 receives a part of th signal of image 1 which corresponds here to a low resolution version (thumbnail) of that signal as well as information representing the structure and the organization of the data in the signal of image 1 (header data) and a first descriptor representative of the uniquely identified signal.

This step corresponds to step S1 of the algorithm of FIG. 5a.

During the following step S51 provision is made for creating a data descriptor of the image signal which gives a description of all the date making up this signal.

This step corresponds to step S2 of the algorithm of FIG. 5a.

The case is taken in the example considered, of a hierarchical tree-structure representation of the image signal illustrated by FIGS. 6 to 9.

The description map (signal descriptor) of the image signal is thus constructed following the tree-structure representation of FIG. 6, that is to say following the order of the progression of the original image in number of tiles, number of resolution levels per tile, number of quality layers, number of components and number and position of packets.

During the following step S52, the creation of another data descriptor is proceeded with, called descriptor of local data, at the communication apparatus considered.

To do this, for reasons of simplification, the signal descriptor (description map of the signal) is used by copying this into memory in the apparatus.

The hierarchical descriptor of local data created corresponds to the one illustrated in FIG. 8.

During step S52 an updating of the hierarchical descriptor of local data is proceeded with by indicating in this descriptor the storage address in the cache memory of the apparatus of the data packets corresponding to the low resolution version of the image signal received (part of the signal).

As shown in FIG. 8 and indicated in the description made with reference to that Figure, this updating step enables the hierarchical descriptor of local data to be made both representative of the data present locally in cache memory of he apparatus C4 (data packets corresponding to the low resolution version of the image signal) as well as of the position of the data at a specific location in that memory (memory address).

As shown diagrammatically in FIG. 1, it is assumed that the communication apparatus C4 also has a viewing window and an interface software program.

Thus, at the following step S53 of the algorithm of FIG. 12a, the user requests to view the image at a resolution for example higher than that which he has already received.

Knowing the signal descriptor (description map of the signal), the communication apparatus C4 is able to translate the request of the user and thus to formulate a request for obtaining data packets numbered $P_a$ to $P_L$ and which correspond to the data be user is missing in order to obtain a higher resolution of the image signal.

The algorithm of FIG. 12a next comprises a step S54 during which the communication apparatus C4 transmits via its associated means of communication, a request containing the signal identifier to the connected communication apparatuses C1, C2, C3 asking them for information on the signal of image 1.

It should be noted that the communication apparatus C4 has obtained elsewhere the information on the apparatuses C1, C2 and C3, i.e. their presence on the distributed network, their IP address, whether the network is the internet, and the fact that they are liable to hold the content of the signal of image 1 that is sought.

This information was for example obtained by the apparatus C4 by virtue of the fact that at the moment of sharing the signal of image 1, the source apparatus S of FIG. 4 which broadcast the low resolution version of the signal of image 1 had added precise information on all the recipients of the broadcast (notification of availability of the identified signal in one or several server apparatuses).

The algorithm of FIG. 12a next comprises a step S55 during which the communication apparatus C4 receives the respective second descriptors of local data, or a part of them, from each of the communication apparatuses C1, C2 and C3.

This local information enables apparatus C4 to have knowledge of the data relative to the identified signal which are locally present at each of the communication apparatuses C1, C2 and C3.

During a following step S56, the communication apparatus C4 performs an analysis of the descriptors of local data or of a part of them which it has received and compares these results with the supplementary data which it wishes to receive to obtain a higher resolution of the signal of image 1.

It will be noted that the hierarchical nature of the descriptors of local data received by apparatus C4 makes it possible rapidly to identify the macro-entities which are wholly present in the other communication apparatuses, without having to go through their descriptor as far as the level of the data packets corresponding to the leaves of the tree.

As already explained above, if a resolution level is entirely available at a communication apparatus, such as the resolution level 0 on apparatus C2 or the resolution levels 0 end 1 on the apparatus C1 of FIG. 4, this is very rapidly detectable by going through the corresponding hierarchical descriptor of local data.

The analysis provided for at step S56 may thus be carried out very rapidly so as to be informed of the content of the cache memories of the communication apparatuses C1, C2 and C3.

The algorithm next comprises a step S57 during which the communication apparatus C4 takes a decision about the choice of one or more communication apparatuses as potential servers.

This decision is taken by apparatus C4 as a function of the parameters which it has available, and in particular the first and second descriptors.

It will be noted that this decision step may be omitted or be absent when the selection of the communication apparatus or apparatuses able to be used as servers is made by a central server such as the apparatus of FIG. 1.

According to still another variant, it may also be considered that a decision is taken by neither the apparatus C4 nor by another apparatus of the network, in order to increase the speed of response to the user's requests.

It should be noted that in the example illustrated in FIG. 12a in which step S57 is carried out, the decision is taken by the communication apparatus C4 as a function of various information available to it.

Apparatus C4 takes into account all the packets $P_a \ldots P_L$ which correspond to the user's request and the data locally available at each communication apparatus as indicated by the hierarchical descriptors of local data which the apparatus has received from them.

Furthermore, the decision may also be taken on the basis of supplementary information which include the bandwidth available for each of the communication apparatuses acting as servers, the bandwidth of the communication apparatus C4 itself (this is because, if apparatus C4 has a very low bandwidth it will not wish to receive too much information in parallel), as well as ancillary information on the overall load of the network, etc.

As shown in FIG. 12a, the communication apparatus C4 has taken the decision to transmit two requests, in parallel, in order to optimize the transfer time of the packets, addressing two communication apparatuses C1 and C3 which both have resolution 1 of the image signal.

Thus, as provided for at step S58, the communication apparatus C4 sends a request to the communication apparatus C1 to obtain the packets $P_a$ to $P_k$.

In parallel, apparatus C4 also sends a request to apparatus C3 to obtain the packets $P_{k+1}$ to $P_L$.

It thus splits the set of supplementary data it wishes to receive into two data subsets.

During the following step S60, the communication apparatus C4 receives data packets corresponding at least in part to the requested data and proceeds, during step S61, with their storage in the cache memory of that apparatus at a specific location (memory address).

The following step E62 provides for updating the hierarchical descriptor of local date of the communication apparatus C4 as a function of the data received at step S60, in order to for the descriptor to be representative both of the data locally present in memory and of their position at a specific location in that memory.

During step S63, provision is made for decoding the data packets and for displaying, in image form, the part of the image signal of higher resolution which the apparatus C4 has just received.

It will be noted that by virtue of the hierarchical descriptors of local data received from the apparatuses C1, C2 and C3, the processing of requests sent by the apparatus C4, at steps S58 and S59, is rapid in that apparatus C4 has available the positions or addresses of the data packets locally present in memory on the apparatuses C1 and C3.

This thus makes it possible to accelerate the processing of the requests so transmitted.

Furthermore, the hierarchical nature of the descriptors of local data makes it possible to avoid going through all the files stored, and, in particular, to have to read all the headers of these files at each request.

This is true in particular when the user of the communication apparatus C4 must identify the data which he is missing based on his hierarchical descriptor of local data, and also when he analyses the content of the hierarchical descriptors of local data received from other apparatuses.

Furthermore, the use of these descriptors of local data representing the local presence or absence of data at the communication apparatuses in the distributed network makes it possible to process the requests with greater efficacy than before.

It will also be noted that the data descriptors used by the invention enable all or part of the data making up the signal in multi-resolution format, and which will be present locally at a communication apparatus, to be described in an efficacious manner.

Furthermore, the use of data descriptors representing locally the presence or the absence of data at a communication apparatus enables communication to be made in a homogenous manner between the various communication apparatuses connected to the network.

Figure 12B:
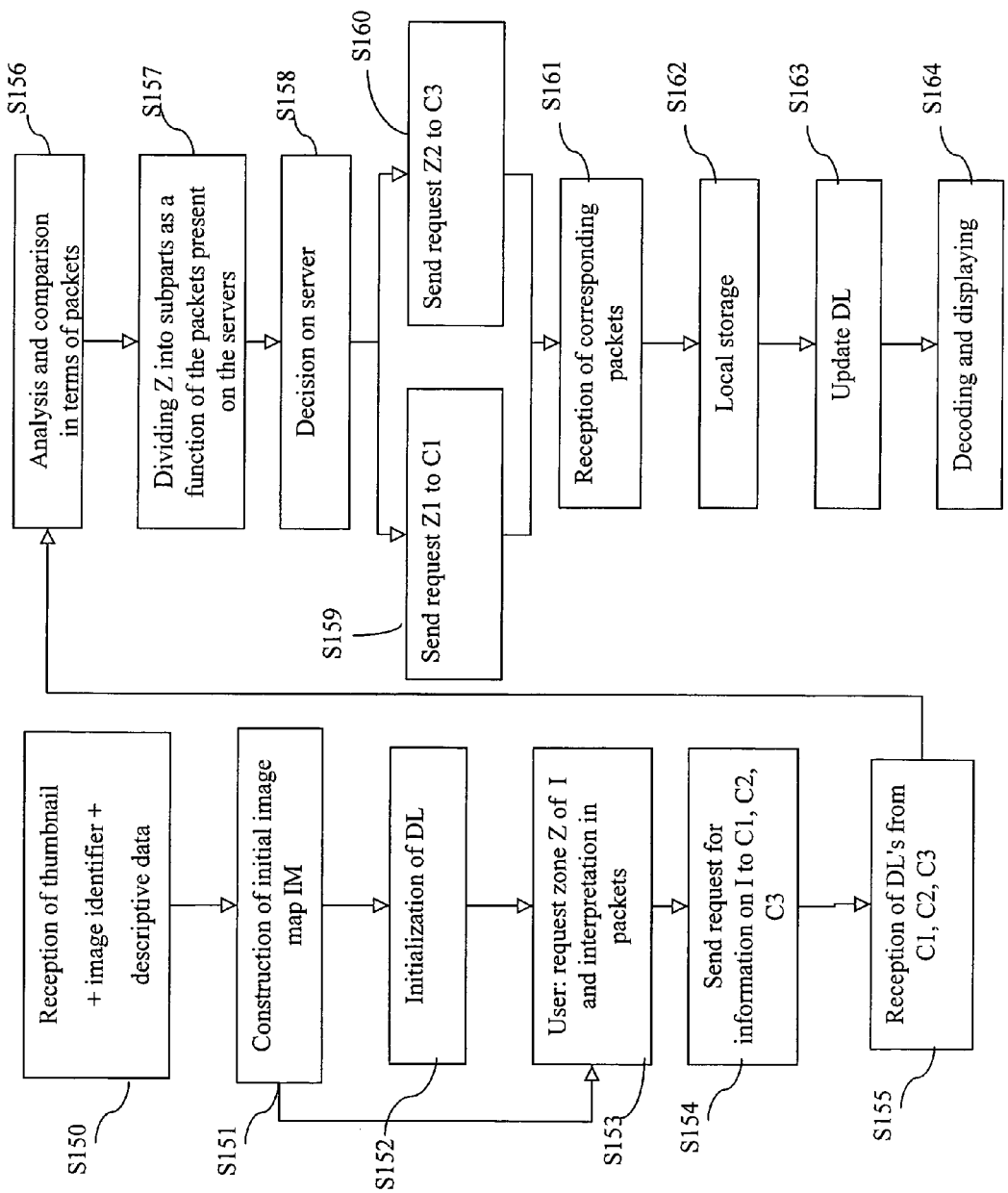

FIG. 12b is a variant embodiment of the algorithm represented in FIG. 12a in which the requests transmitted by the client machine (apparatus C4) are formulated in terms of parts of signal or of zones of interest of that signal.

According to this variant, it is always the client machine which decides on the choice of the servers and of the different data to be asked of the chosen server(s), as a function, in particular, of the data descriptors received from the apparatuses C1, C2 and C3.

More particularly, the algorithm of FIG. 12b comprises the steps S150 to S164 of which only some are modified with respect to the steps S50 to S63 of FIG. 12a.

More particularly, steps S150, S151, S152, S154, S156, S158, S161, S162, S163 and S164 are identical respectively to steps S50, S51, S52, S54, S56, S57, S60, S61, S62 and S63 of the algorithm of FIG. 12a.

However, step S153 of the algorithm of FIG. 12b differs from step S53 of the algorithm of FIG. 12a in that the client machine (apparatus C4) formulates a request specifying a part of the image signal or zone Z and also establishes the correspondence in terms of data packets contained within that zone.

It will be noted that zone Z considered may be a spatial zone of the signal or a zone of the signal in terms of resolution, that is to say, for example, a zone which corresponds to the whole signal at a given resolution and at a given quality.

It is also possible for zone Z specified in the request to correspond both to a spatial zone of the signal and to a zone in terms of resolution of that signal.

Moreover, it will be noted that during step S156 the descriptors of local data received from the different communication apparatuses C1, C2 and C3 are compared to the request of step S153 in terms of data packets.

The algorithm of FIG. 12b next comprises a step S157 which did not exist in the algorithm of FIG. 12a and which consists of providing for the cutting up into sub-parts of the part of the signal or zone requested in the request, for example denoted Z1 and Z2, as a function, in particular, of the presence of the data packets corresponding to a zone in one or more communication apparatuses.

Once the choice of the server or servers has been made at step S158, a request specifying the zone Z1 is transmitted to the apparatus C1 at step S159, while a request specifying the zone Z2 is transmitted to the apparatus C3 at step S160.

It will be noted that, at step S158, the decision may also be taken as a function of the state of the network.

Figure 12C:
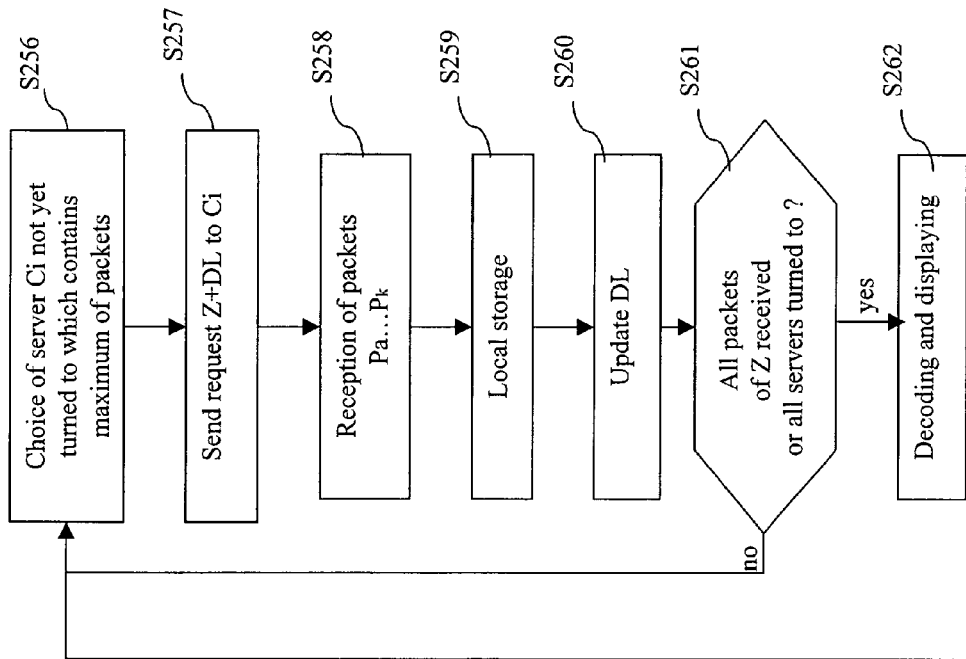
Figure 12C:
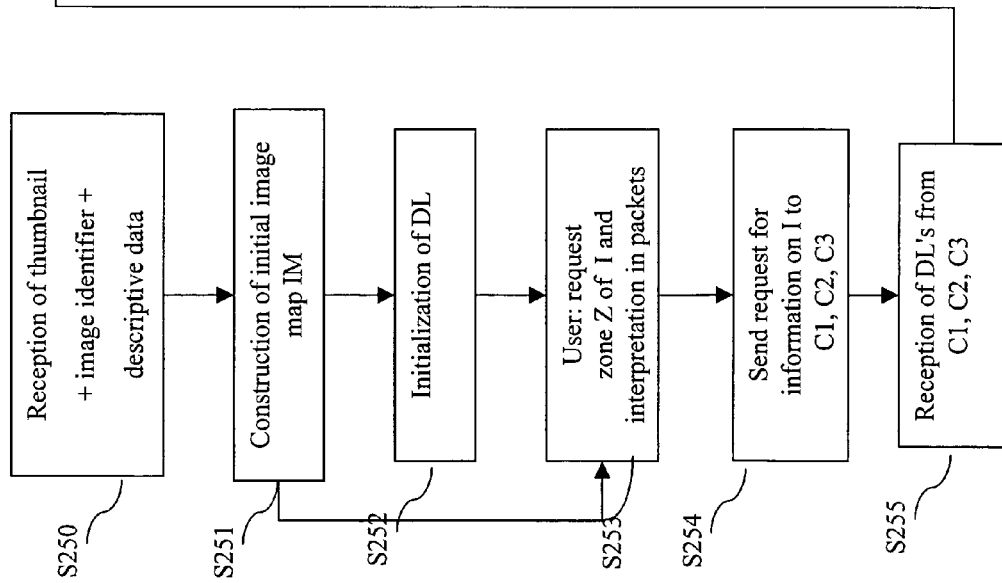

FIG. 12c shows a variant embodiment of the algorithm of FIG. 12b.

In the algorithm of FIG. 12c, the client machine which has sent out a request specifying a zone or part Z of the signal and which has interpreted this request in terms of data packets, has no further need later on, after analysis of the descriptors of local data received from the other communication apparatuses, to re-translate the data packets which it is missing in terms of zones before sending the requests adapted to the different communication apparatuses which contain these data.

Moreover, according to this variant, the fact of no longer having to cut up into zones the part of the signal requested in the request avoids receiving several times the data packets contributing to the boundaries of the zones.

Figure 13:
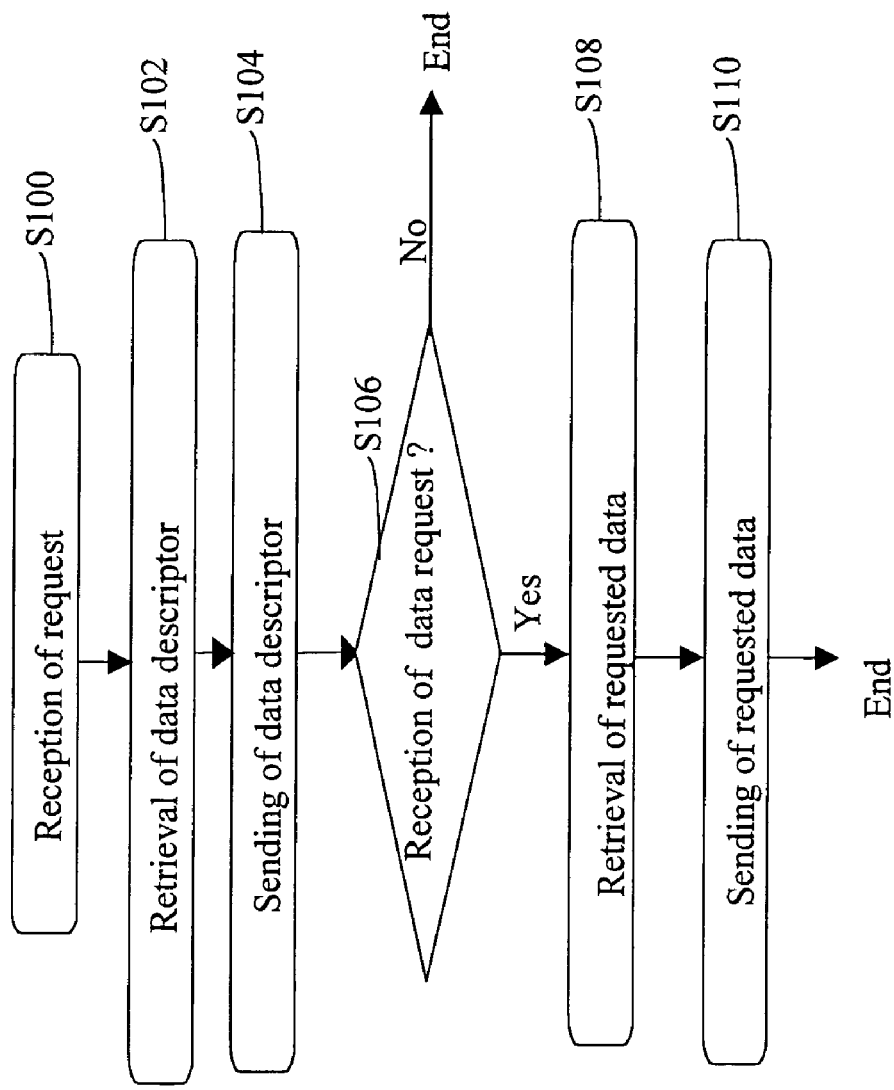
FIG. 13 is an algorithm for implementation of the data processing method according to the invention.

The algorithm of FIG. 13 comprises instructions or portions of code corresponding to steps of the method according to the invention.

A computer program based on this algorithm is stored in the apparatus or device according to the invention of FIG. 14 and makes it possible, when executed, to implement the method according to the invention in a server apparatus in the distributed communication network.

The algorithm of FIG. 13 commences with a first step S100 during which the server apparatus receives a request containing the signal identifier from a client apparatus, such as the communication apparatus C4.

If this identifier, which in general corresponds to the first descriptor of the signal, is known by the server apparatus under concern, the algorithm of FIG. 13 comprises a further step S102 of retrieving locally the descriptor of data (second descriptor) which depends on me first descriptor representative of the identified digital signal.

During the following step S104, the server apparatus sends to the client apparatus which is at the origin of the request the second descriptor.

During the following step S106, provision is made for testing whether a request of data originating from a client apparatus is received or not.

In the negative, the algorithm comes to an end.

In the affirmative, step S106 is followed by step S108 during which the server apparatus retrieves in its local storage at least a part of the requested data which is specified in the previously received request of data.

Then, during next step S110, the server apparatus sends to the client apparatus under concern said at least part of requested data.

This last step terminates the algorithm of FIG. 13.

The algorithm of FIG. 12b comprises the steps S250 to S262 among which the steps S250, S251, S152, S254, S255, S258, S259 and S262 are respectively identical to e steps S50, S51, S52, S54, S55, S60, S61, S62 and S63 of FIG. 12a.

As was seen previously, step S253 of formulating a request specifies the zone or sub-part of the signal which interests the user and also establishes a correspondence (interpretation) of that zone or part in terms of data packets of the signal.

After having received the descriptors of local data of the communication apparatuses C1, C2 and C3 at step S255, the algorithm of FIG. 12c comprises a following step S256 during which the apparatus C4 chooses among all the communication apparatuses connected and which have data packets which it is missing, the one which holds the greatest number of these data packets.

Once the communication apparatus (server), denoted Ci, is identified, then the following step S257 provides for transmitting to the latter a request specifying the zone or part of the signal Z considered as well as the descriptor of local data DL of the apparatus C4 (state of the local cache memory of the apparatus).

It will nevertheless be noted that it is not necessary to transmit the entirety of the descriptor of local data of the apparatus C4 at this step.

It is even preferable to transmit only the information of the presence indicated in the descriptor represented in FIG. 8 by the presence marker "RECU" and which are associated with the different data packets.

More particularly it is not necessary also to transmit the position of these data packets in the cache memory of the apparatus C4.

In response to this request, the communication apparatus Ci transmits to the apparatus C4 a certain number of packets Pa to Pk which correspond to the zone or part of the signal specified in the request.

After receiving the packets at step S258, the apparatus S4 stores them locally at step S259 and updates the descriptor of local data DL at step S260.

The algorithm of FIG. 12c next comprises a step S261 during which a test is carried out in order to determine if all the data packets corresponding to the zone or part of the signal Z requested have been received or if all the communication apparatuses connected have been called upon.

If not step S261 is followed by step S256 already described above.

If there remain servers to consult among the list of potential servers (communication apparatuses C1, C2 and C3) then the following server in the list which contains the greatest number of data packets is chosen at step S256 and the following steps already described above are then repeated.

When the result performed at step S261 is positive, then a decoding and display of the data is next provided for at step 8262.

It will be noted that in this variant, it is the server Ci which takes the decision as to the data packets to send to the client machine (communication apparatus C4) as a function of the information supplied by the apparatus C4 about the local presence of data on the latter.

It should be noted that in this variant the server may also maintain a record of the data packets with it has already transmitted to other apparatuses and, consequently, re-transmit to an apparatus only those data which that same apparatus has not already requested of it previously.

Figure 12D:
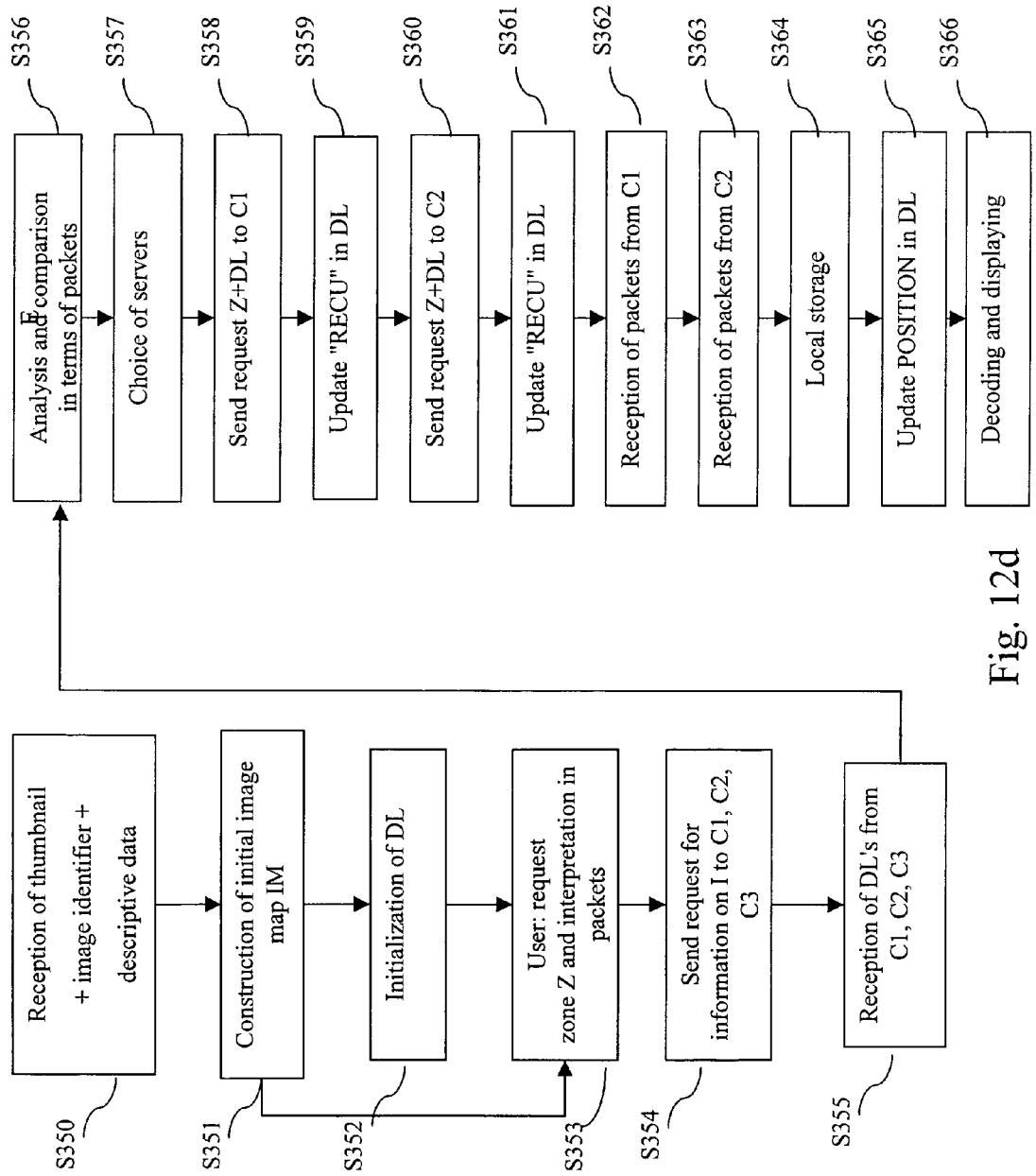

FIG. 12d shows a variant embodiment of the algorithm of FIG. 12c.

According to that variant, provision is made for transmission of parallel requests from the client machine to the different communication apparatuses having the missing data, based on a prediction of the behavior of these apparatuses. This makes it possible to not to have to await the response of an apparatus in order to send another request to another apparatus.

More particularly, this algorithm comprises different steps S350 to S366 among which the steps S350 to S356, S357, S364 and S366 are respectively identical to the steps S150 to S156, S158, S162 and S164 of the algorithm of FIG. 12b.

As soon as the client machine (apparatus C4) has decided on the choice of the server or servers (communication apparatuses C1, C2 and C3) which will be able to supply it with all the missing data packets (step S357), the algorithm of FIG. 12d makes provision for transmitting a request specifying the signal zone or part Z desired, as well as its descriptor of local data DL (in particular the presence information "RECU") to the communication apparatus C1.

During the following step S350, the communication apparatus C4 updates its descriptor of local data for the fields or presence markers RECU with respect to the packets which it expects to receive from the server C1.

During the following step S360, the apparatus C4 transmits the request specifying the signal zone or part Z, as well as the descriptor of local data DL updated at the preceding step, to the communication apparatus or server C2.

In this manner, the apparatus C2 will not send the data packets concerning the zone Z and which ought be sent by the server C1.

In a similar manner, during step S361, apparatus C4 updates its descriptor of local data as a function of the data packets which it expects to receive from the apparatus C2.

During the following steps S362 and S363, the apparatus C4 receives from the apparatus C1 and C2 the corresponding data packets.

These packets are next locally stored on the apparatus C4 during the step S364 and, during the following step S365, the apparatus C4 updates the descriptor of local data DL in relation to the fields POSITION which indicate the position of the data packets in the local cache memory.

The algorithm next terminates with a step (S366) of decoding and displaying of the data.

Figure 12E:
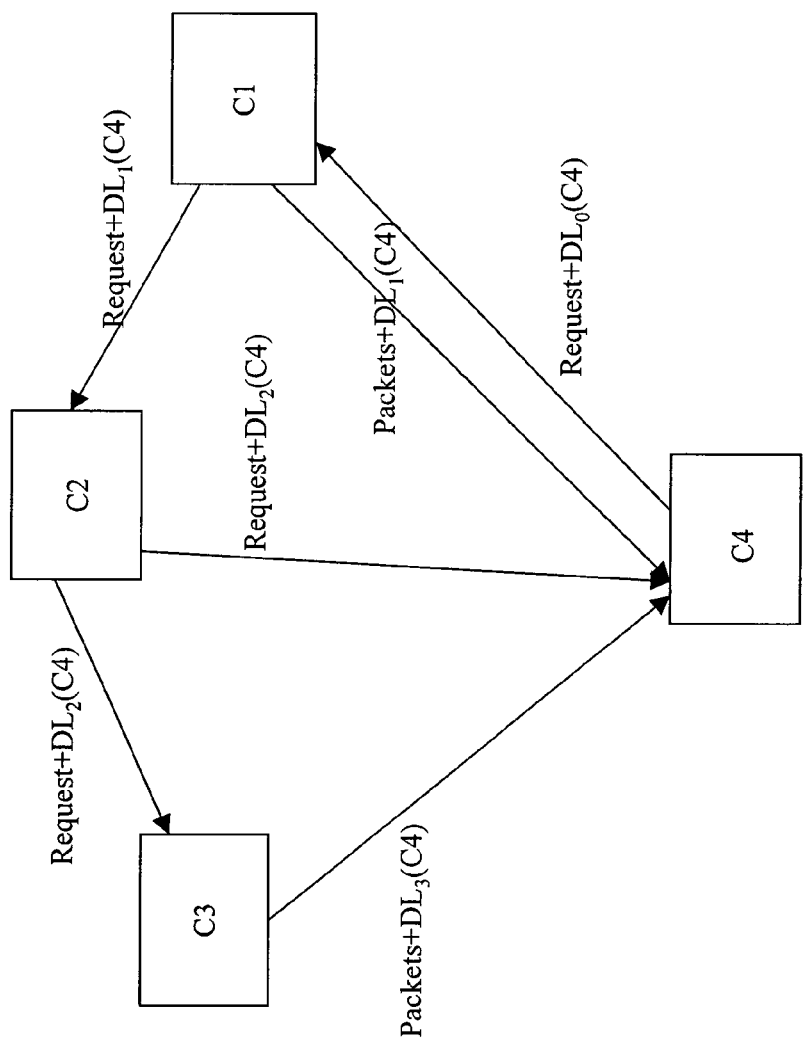
FIGS. 12e and 12f illustrate another mode of operation of the distributed network of FIG. 4.
Figure 12F:
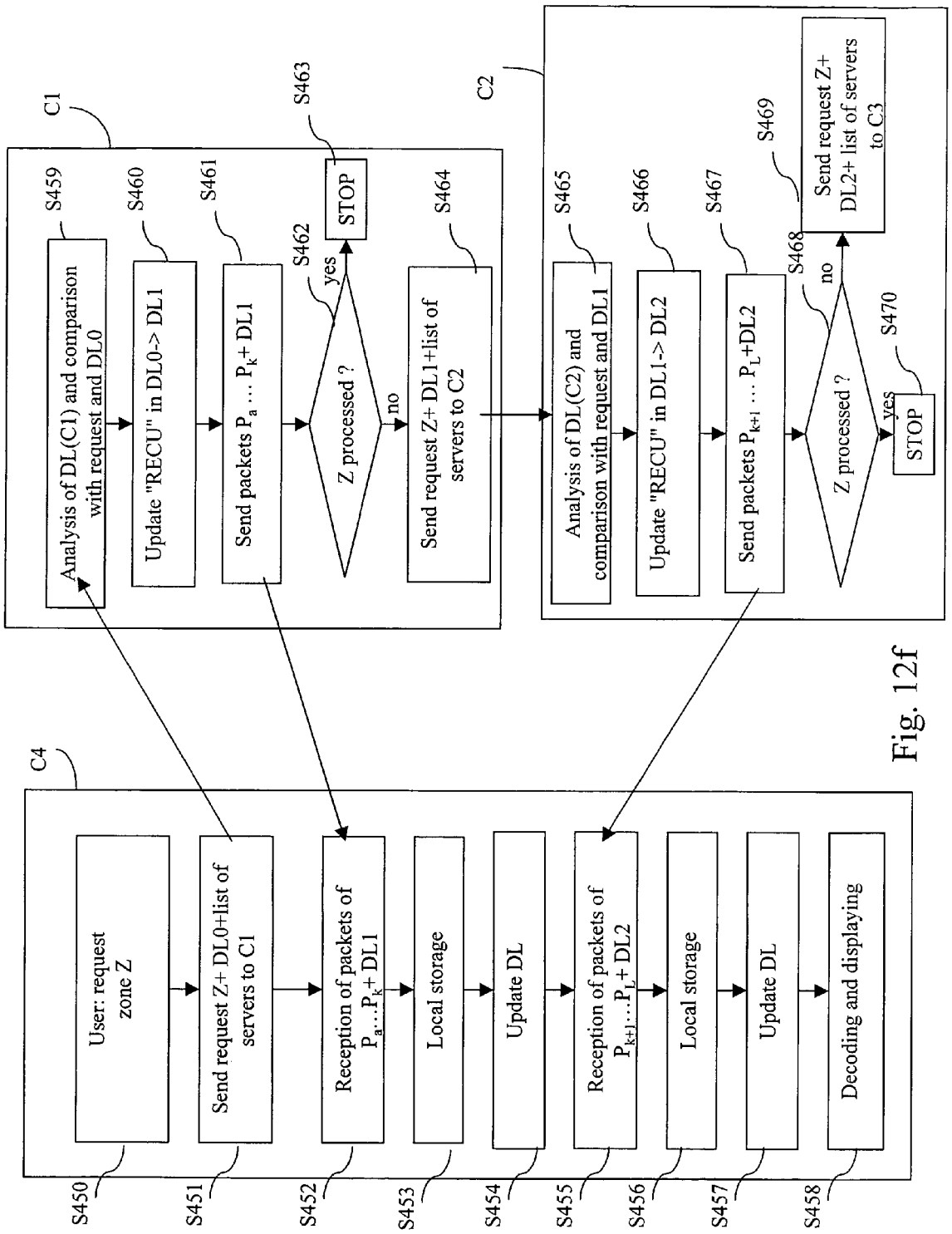

FIGS. 12e and 12f illustrate a mode of operation of the distributed communication network of FIG. 4 which is different to that illustrated by the algorithms of FIGS. 12a to 12d.

More particularly, as represented in FIG. 12e which illustrates diagrammatically the flow of communications in a distributed network, the communication apparatus C4 (client machine) transmits a request of data relative to the identified signal to at least one of the communication apparatuses of the network, i.e. in the example, apparatus C1 (client apparatus), as well as its descriptor of local data (second descriptor) denoted $DL_0(C4)$.

It will be noted that the descriptor of local data $DL_0(C4)$ is representative of the presence of local data in the cache memory of apparatus C4.

It should also be noted that the request sent out by apparatus C4 may either specify data in terms of data packets or in terms of signal part or zone of interest Z.

In this embodiment, it is the communication apparatuses of the network, i.e. apparatuses C1, C2 and C3 (server apparatuses) which between them manage the response to give to th request from apparatus C4 and the latter no longer receives the descriptors of local data of the aforementioned apparatuses.

Apparatuses C1, C2 and C3 playing the role of server take the decision as to the data to transmit to apparatus C4 progressively as the request sent out by the latter is communicated to them.

In order for the response provided by all these apparatuses to be coherent and coordinated, it is necessary to update the second descriptor of local data of apparatus C4 (client machine) within these apparatuses by means of an updating of the fields RECU progressively with the data packets transmitted to this apparatus.

When the communication apparatus C1 (server) receives the request and the descriptor of local data of apparatus C4. $DL_0(C4)$ it analyzes this request, decides on a set of data packets which it can transmit to apparatus C4 and updates the descriptor by updating, more particularly, the fields RECU corresponding to the data packets transmitted.

The second descriptor of apparatus C4 updated by apparatus C1 is denoted $DL_1(C4)$.

The communication apparatus C1 next transmits all the data packets it holds locally to apparatus C4 (client machine) as well as possibly the data descriptor $DL_1(C4)$ updated.

More particularly, it is not necessary to transmit the updated descriptor $DL_1(C4)$ in that the apparatus C4 receiving the packets from apparatus C1 is capable itself of performing this updating based on its descriptor $DL_0(C4)$.

Furthermore, apparatus C1 transmits to next communication apparatus C2 (server) the request of data coming from apparatus C4 as well as the updated descriptor of local data of the latter, $DL_1(C4)$.

In its turn, the communication apparatus C2 analyzes the request and decides on a set of packets which it may transmit to apparatus C4 taking into account the updated descriptor of local data of the latter.

Apparatus C2 next updates the second descriptor of local data of apparatus C4 received from apparatus C1 and transmits the latter, denoted $DL_2(C4)$, with a set of data packets which it planned to transmit to the communication apparatus C4.

Furthermore, apparatus C2 transmits to next apparatus C3 (server) the request from apparatus C4 possibly as well as the second descriptor of local data of the latter $DL_2(C4)$, updated by apparatus C2.

Similarly, apparatus C3 undertakes an analysis of the request, as well as of the updated descriptor of local data of apparatus C4.

Apparatus C3 next decides on the set of data packets to transmit to apparatus C4 and proceeds accordingly with an updating operation of its second descriptor of local data which is then denoted $DL_3(C4)$.

The set of data packets in question as well as possibly the aforementioned descriptor are then transmitted to apparatus C4.

FIG. 12F illustrates the operation of the network represented in FIG. 12e and, more particularly, of the communication apparatuses C4, C1 and C2 by representing the different algorithms implemented in those apparatuses.

In accordance with the exchange of requests and responses illustrated in FIG. 12e, communication apparatus C4 executes a first step S450 during which a user of that apparatus specifies a request in terms of signal sub-part or zone of interest Z.

During the following step S451, communication apparatus C4 transmits this request specifying, for example, the desired sub-part Z of the signal as well as the descriptor of local data $DL_0$ of apparatus C4, as well as a list of the different communication apparatuses (servers) from which apparatus C4 may request data.

In this embodiment, this list has been communicated to apparatus C4 by the central server 20 of FIG. 1.

During this step, apparatus C4 transmits all these data to communication apparatus C1 (server).

At its end, communication apparatus C1 receives all these data, performs an analysis of its descriptor of local data DL(C1) in order to know which are the data present locally on the latter and carries out a comparison between these data and those specified in the request, while taking into account the descriptor of local data $DL_0(C4)$ (step S459).

During the following step, denoted S460, communication apparatus C1 updates the fields RECU in the descriptor of local data of the communication apparatus C4 in the form of the modified descriptor $DL_1(C4)$.

During the following step S461, communication apparatus C1 sends the data packets $P_a \ldots P_k$ which it has decided to transmit at step S459 to communication apparatus C4, as well as possibly the updated descriptor of local data $DL_1(C4)$.

At its end, communication apparatus C4 receives these packets as well as the descriptor updated at step S452 and next proceeds with the local storage of the received packets, as well as with updating of its descriptor of local data DL which it has kept during the respective steps denoted S453 and S454.

Returning to the algorithm implemented in apparatus C1, step S461 is followed by a step S462 during which a test is carried out to determine whether the set of data packets transmitted at the preceding step covers the whole sub-part or zone of interest Z requested by apparatus C4.

If this is the case, this last step is followed by a step S463 which terminates the algorithm by sending an end of processing message to apparatus C4 which will set off the operations of decoding and display.

Alternatively, apparatus C4 may set up a correspondence between the zone Z and the data packets which it contains and verify on receiving packets whether the request has been processed in its entirety.

On the contrary, when communication apparatus C1 has not transmitted to apparatus C4 all the data packets that the latter specified in its request, step S462 is followed by a step S464.

During this last step, communication apparatus C1 transmits to communication apparatus C2 the request specifying the sub-part or zone Z of the signal desired by apparatus C4, as well as the descriptor of local data of the latter updated as a function of the transmission of data packets performed at step S461 and a list of the other communication apparatuses (servers).

The algorithm implemented by communication apparatus C2 commences by a step S465 similar to step S459 of the algorithm implemented in apparatus C1.

During this step, apparatus C2 performs an analysis of its own descriptor of local data DL(C2) and makes a comparison of the data present locally with those specified in the request of apparatus C4, taking into account the updated descriptor of local data $DL_1(C4)$ of the latter.

At this step a decision is taken concerning the set of data packets to be transmitted to communication apparatus C4 and the following step S466 provides for updating the corresponding fields RECU in the descriptor of local data of apparatus C4.

During the following step S467, communication apparatus C2 transmits to apparatus C4 the data packets which it has decided to send it, i.e. the packets $P_{k+1} \ldots P_{Li}$ as well as possibly the descriptor of local data of apparatus C4 updated at the preceding step, $DL_2(C4)$.

At its end, communication apparatus C4 receives these packets and the descriptor updated during step S455 and, during the following steps S456 and S457, proceeds respectively with the local storage of these packets and with the updating of the descriptor of local data DL.

During the following step S458 communication apparatus C4 proceeds with decoding and displaying the data so received.

Returning to the algorithm implemented by communication apparatus C2, step S467 is followed by a step S468.

During this last step, a test is performed in order to determine whether, taking account of the descriptor of local data of apparatus C4 updated at step S466 and of the request from apparatus C4, there remain data packets corresponding to the sub-part or zone of interest Z desired by the user and which have not yet been transmitted to apparatus C4.

Should the whole of the sub-part of the signal or zone of interest Z have been processed, then the algorithm is terminated by a step S470 identical to the step S463 already described.

On the contrary, if there remain data to be transmitted to communication apparatus C4, then step S468 is followed by a step S469. During this step apparatus C2 transmits to communication apparatus C3 (server) the request specifying the sub-part or zone of interest Z desired by communication apparatus C4, as well as the descriptor of local data of the latter updated at step S466 and a list of the other communication apparatuses.

It will be noted that in the example of FIG. 12f it has been considered, by contrast with what is shown in FIG. 12e, that step S469 was not performed in apparatus C2 and that the entire zone desired by the user had been processed.

This is the reason why communication apparatus C4 proceeds with decoding and displaying of the data received at step S458 after having received the two sets of data packets from the apparatuses C1 and C2.

However, the same reasoning remains applicable to any number of communication apparatuses playing the role of potential servers.

With reference to FIG. 14, an example of a programmable communication apparatus implementing the invention is described.

Each of the communication apparatuses of FIGS. 1, 4, 12e, 12f and 13 is, for example, identical to the apparatus of FIG. 14.

More particularly, within a distributed network, each apparatus connected is liable to implement the invention and must thus posses the means making it adapted to that implementation.

The apparatus of FIG. 14 comprises the device according to the invention.

According to the chosen embodiment shown in FIG. 14, an apparatus implementing the invention is for example a microcomputer 200 or a workstation connected to different peripherals, for example a digital moving image camera 201 (or a scanner, or any means of acquiring or storing an image) connected to a graphics card and supplying multimedia data to the apparatus.

The apparatus 200 comprises a communication bus 202 to which there are connected:
- a central processing unit 203 (microprocessor),
- a read only memory 204, able to contain the programs "Prog", "Prog1" and "Prog2",
- a random access memory 206 (cache memory), comprising registers 207 adapted to record variables and parameters created and modified during the execution of the aforementioned programs, in particular N, l, nc, "address", "length", and request $P_a \ldots P_L$, mentioned with reference to the preceding Figures, as well as the descriptor of local data DL of the apparatus and the data packets processed during the execution of the different preceding algorithms,
- a screen 208 for displaying the data and/or serving as a graphical interface with the user, who will be able to interact with the programs according to the invention, using a keyboard 210 or any other means such as a pointing device, for example a mouse 211 or an optical stylus,
- a hard disk 212, able to contain the aforementioned programs "Prog", "Prog1" and "Prog2",
  - a disk drive 214 adapted to receive a diskette 216 and to read or write thereon data processed or to be processed according to the invention,
  - a communication interface 218 connected to a distributed communication network 220, for example the internet, the interface being able to transmit and receive data.

In the case of audio data, the apparatus further comprises an input/output card (not shown) connected to a microphone 222.

The communication bus allows communication and interoperability between the different elements included in the microcomputer 200 or connected to it. The representation of the bus is non-limiting and, in particular, the central processing unit is able to communicate instructions to any element of the microcomputer 200 directly or by means of another element of the microcomputer 200.

The executable code of each program enabling the programmable apparatus to implement the processes of FIGS. 5a, 5b, 9, 11 and 12a-f according to the invention, may be stored, for example, on the hard disk 212 or in read-only memory 204 as shown in FIG. 14.

According to a variant, the diskette 216 can contain data as well as the executable code of the aforementioned programs which, once read by the apparatus 200, will be stored on the hard disk 212.

As a second variant, the executable code of the programs can be received by the intermediary of the communication network 220, via the interface 218, in order to be stored in an identical fashion to that described previously.

The diskettes can be replaced by any information carrier such as a compact disc (CD-ROM) or a memory card. Generally, an information storage means, which can be read by a computer or microprocessor, integrated or not into the device, and which may possibly be removable, is adapted to store in memory one or more programs whose execution permits the implementation of the method according to the invention.

More generally, the program or programs may be loaded into one of the storage means of the apparatus 200 before being executed.

The central processing unit 203 will control and direct the execution of the instructions or portions of software code of the program or programs according to the invention, these instructions being stored on the hard disk 212 or in the read only memory 204 or in the other aforementioned storage elements. On powering up, the program or programs which are stored in a non-volatile memory, one or example the hard disk 212 or the read-only memory 204, are transferred into the random-access memory 206 (RAM), which will then contain the executable code of the program or programs according to the invention, as well as registers for storing the variables and parameters necessary for implementation of the invention.

It should be noted that th communication apparatus comprising the device according to the invention can also be a programmed apparatus.

This apparatus then contains the code of the computer program or programs for example fixed in an application specific integrated circuit (ASIC).

The invention claimed is:

1. A method of processing a digital signal identified by a unique identifier in a distributed communication network composed of several communication apparatuses, comprising steps of:
    storing at least a part of data constituting the identified digital signal in a local storage located in one of the communication apparatus; and
    managing two descriptors related to the identifier within the local storage, the two descriptors including a first descriptor, which provides a description representing a structure and an organization of the data constituting the identified digital signal, and a second descriptor, which is dependent on the first descriptor and representative of the part of the data stored in the local storage,
    wherein the data constituting the identified digital signal is in a multiresolution format and wherein the second descriptor has a hierarchical structure related to the multiresolution format.

2. A method according to claim 1, further comprising a step of updating the second descriptor as a function of the part of the data constituting the identified digital signal received and stored in the local storage.

3. A method according to claim 2, further comprising steps, performed by a server apparatus in the communication network, of:
    receiving from a communication apparatus one request for data relative to the identified digital signal and one second descriptor representative of data that is locally present at the communication apparatus from where the request originated;
    retrieving from the local storage at least part of the requested data;
    sending to the communication apparatus from where the request originated the at least part of the requested data retrieved from the local storage; and
    updating the one second descriptor as a function of the at least part of the requested data sent in the sending step.

4. A method according to claim 3, further comprising a step, performed by the server apparatus in the communication network, of sending to another server apparatus the updated second descriptor and the request for data, which has been modified to take into account the at least part of the requested data previously sent by the server apparatus.

5. A method according to claim 1, further comprising a step of sending from a server apparatus, a notification of availability of the identified digital signal to at least one client apparatus in the communication network, including the first descriptor of the identified digital signal.

6. A method according to claim 5, further comprising steps, performed by the server apparatus in the communication network, of:
    receiving from a client apparatus a request containing the unique identifier; and
    sending to the client apparatus the second descriptor related to the unique identifier and representative of the part of the data constituting the identified digital signal stored in the local storage, if the unique identifier is known by the server apparatus.

7. A method according to claim 1, further comprising steps, performed by a server apparatus in the communication network, of:
    receiving from a client apparatus a request containing the unique identifier; and
    sending to the client apparatus the second descriptor related to the unique identifier and representative of the part of the data constituting the identified digital signal stored in the local storage, if the unique identifier is known by the server apparatus.

8. A method according to claim 7, further comprising steps, performed by the server apparatus in the communication network, of:
    receiving from the client apparatus one request for data relative to the identified signal;
    retrieving from the local storage at least part of the requested data; and
    sending to the client apparatus the at least part of the requested data retrieved from the local storage.

9. A method according to claim 1, further comprising steps, performed by a client apparatus in the communication network prior to the storing step, of:
    receiving the first descriptor representative of the identified digital signal; and
    storing the first descriptor in the local storage.

10. A method according to claim 9, further comprising a step, performed by a client apparatus in the communication network, of receiving a notification of availability of the data constituting the identified digital signal and corresponding to the unique identifier.

11. A method according to claim 9, further comprising a step, performed by a client apparatus in the communication network, of sending to at least one server apparatus at least one request containing the unique identifier.

12. A method according to claim 11, further comprising steps, performed by a client apparatus in the communication network for retrieving at least a part of the identified digital signal, of:
    receiving at least one second descriptor representative of data locally present on at least one server; and
    issuing at least one request for data, directed to the at least one server, as a function of the first descriptor and the at least one second descriptor.

13. A method according to claim 12, further comprising a step, performed by a client apparatus in the communication network, of receiving from at least one server at least part of the data constituting the identified digital signal and which has been specified in a previously sent request for data.

14. A method according to claim 9, further comprising a step, performed by a client apparatus in the communication network, of sending to at least one server at least one request for data as a function of the received first descriptor, and the second descriptor representative of data locally present on the client apparatus.

15. A method according to claim 1, wherein the first descriptor is representative of all available resolutions and their representation units (precincts) in a compressed format.

16. A method according to claim 15, wherein the second descriptor is representative of the units (precincts) of the compressed format as referenced in the first descriptor.

17. An information storage medium that can be read by a computer or a microprocessor containing code instructions of a computer program for executing the steps of the method according to claim 1.

18. A partially or totally removable information storage medium that can be read by a computer or a microprocessor containing code instructions of a computer program for executing the steps of the method according to claim 1.

19. A computer program product embodying sequences of instructions or portions of software code for implementing the steps of the method according to claim 1, when the sequences of instructions or portions of software code are loaded and executed by a programmable apparatus.

20. A method according to claim 1,
    wherein the hierarchical structure of the second descriptor is organized in a tree that has nodes at different levels, and
    wherein the method further comprises a step of adding a marker indicating a presence of data at a node level of the hierarchical structure.

21. A method according to claim 1, further comprising a step of updating each node of the hierarchical structure situated upstream of a current node.

22. A device for processing a digital signal, the digital signal being identified by a unique identifier in a distributed communication network composed of several communication apparatuses, comprising:
    means for storing at least a part of data constituting the identified digital signal in a local storage located in one of the communication apparatuses; and
    means for managing two descriptors related to the unique identifier within the local storage, the two descriptors including a first descriptor, which provides a description representing a structure and an organization of the data constituting the identified digital signal, and a second descriptor, which is dependent on the first descriptor and representative of the part of the data stored in the local storage,
    wherein the data constituting the identified digital signal is in a multiresolution format and wherein the second descriptor has a hierarchical structure related to the multiresolution format.

23. A device according to claim 22, further comprising means for updating the second descriptor as a function of the part of the data constituting the identified digital signal received and stored in the local storage.

24. A device according to claim 23,
    wherein the device is part of a system in the communication network,
    wherein the system includes a server apparatus in the communication network, and
    wherein the server apparatus includes:
        means for receiving from a communication apparatus one request of data relative to the identified digital signal and one second descriptor representative of data that is locally present at the communication apparatus from where the request originated;
        means for retrieving from the local storage at least part of the requested data;
        means for sending to the communication apparatus from where the request originated the at least part of the requested data retrieved from the local storage; and
        means for updating the one second descriptor as a function of the at least part of the requested data sent by the means for sending.

25. A device according to claim 24, further comprising, in the server apparatus in the communication network, means for sending to another server apparatus the updated second descriptor and the request for data, which has been modified to take into account the at least part of requested data previously sent by the server apparatus.

26. A device according to claim 22, further comprising means for sending from a server apparatus, a notification of availability of the identified digital signal to at least one client apparatus in the communication network, including the first descriptor of the identified digital signal.

27. A device according to claim 26,
    wherein the device is part of a system in the communication network,
    wherein the system includes a server apparatus in the communication network, and
    wherein the server apparatus includes:
        means for receiving from a client apparatus a request containing the unique identifier; and
        means for sending to the client apparatus the second descriptor related to the unique identifier and representative of the part of the data relative to the identified digital signal stored in the local storage, if the unique identifier is known by the server apparatus.

28. A device according to claim 22,
    wherein the device is part of a system in the communication network,
    wherein the system includes a server apparatus in the communication network, and
    wherein the server apparatus includes:
        means for receiving from a client apparatus a request containing the unique identifier; and
        means for sending to the client apparatus the second descriptor related to the unique identifier and representative of the part of the data constituting the identified digital signal stored in the local storage, if the unique identifier is known by the server apparatus.

29. A device according to claim 28,
    wherein the server apparatus in the communication network includes:

means for receiving from the client apparatus one request for data relative to the identified digital signal;

means for retrieving from the local storage at least part of the requested data; and means for sending to the client apparatus the at least part of the requested data retrieved from the local storage.

30. A device according to claim 22, wherein a client apparatus is part of the communication network; and wherein the client apparatus includes:

means for receiving the first descriptor representative of the identified digital signal; and means for storing the first descriptor in the local storage.

31. A device according to claim 30, wherein the client apparatus in the communication network includes means for receiving a notification of availability of the data constituting the identified digital signal and corresponding to the unique identifier.

32. A device according to claim 30, wherein the client apparatus in the communication network includes means for sending to at least one server apparatus at least one request containing the unique identifier.

33. A device according to claim 32, wherein the client apparatus in the communication network function to retrieve at least a part of the identified digital signal, and wherein the client apparatus includes:

means for receiving at least one second descriptor representative of data locally present on at least one server; and means for issuing at least one request for data, directed to the at least one server, as a function of the first descriptor and the at least one second descriptor.

34. A device according to claim 33, wherein the client apparatus in the communication network includes means for receiving from at least one server at least part of the data constituting the identified digital signal and which has been specified in a previously sent request for data.

35. A device according to claim 30, wherein the client apparatus in the communication network includes means for sending to at least one server at least one request for data as a function of the received first descriptor, and the second descriptor representative of data locally present on the client apparatus.

36. A device according to claim 22, wherein the first descriptor is representative of all available resolutions and their representation units (precincts) in a compressed format.

37. A device according to claim 36, wherein the second descriptor is representative of the units (precincts) of the compressed format as referenced in the first descriptor.

38. A a device according to claim 22, wherein the device is incorporated in a communication apparatus.

39. A device according to claim 22, wherein the hierarchical structure of the second descriptor is organized in a tree that has nodes at different levels, and wherein a marker is used to indicate a presence of data at a node level of the hierarchical structure.

40. A device according to claim 22, further comprising means for updating each node of the hierarchical structure situated upstream of a current node.

* * * * *